United States Patent [19]

Endoh

[11] Patent Number: 5,050,011
[45] Date of Patent: Sep. 17, 1991

[54] RECORDING CONTROL APPARATUS

[75] Inventor: Kenjiro Endoh, Tokyo, Japan

[73] Assignee: Kabushiki Kaisha Toshiba, Kawasaki, Japan

[21] Appl. No.: 512,418

[22] Filed: May 24, 1990

Related U.S. Application Data

[63] Continuation of Ser. No. 214,129, Jun. 30, 1988, Pat. No. 4,965,680.

[30] Foreign Application Priority Data

| Jun. 30, 1987 | [JP] | Japan | 62-163002 |
| Jun. 30, 1987 | [JP] | Japan | 62-163021 |
| Jun. 30, 1987 | [JP] | Japan | 62-163022 |
| Jan. 20, 1988 | [JP] | Japan | 63-9883 |
| Jan. 20, 1988 | [JP] | Japan | 63-9884 |

[51] Int. Cl.$^5$ .................................................. G11B 15/04
[52] U.S. Cl. .................................................. 360/60
[58] Field of Search ........................................ 360/60

[56] References Cited

U.S. PATENT DOCUMENTS 4,775,901 10/1988 Nakano .................................. 360/60

Primary Examiner—Vincent P. Canney
Attorney, Agent, or Firm—Cushman, Darby & Cushman

[57] ABSTRACT

A recording/reproducing system according to this invention for use in, for example, a digital audio tape recorder is applied to a type in which recording of an input formation signal on a recording medium is restricted, and can ensure releasing of the recording restriction by using release-signal-holding mediums on which a release signal for releasing the recording restriction is recorded. In this case, the release signal is affixed with frequency data for restricting the quantity of the information signal to be recorded on recording medium, and this frequency data is updated in such a way that the greater the number of recording the information signal on recording medium, the smaller the recordable quantity of the information signal.

2 Claims, 23 Drawing Sheets

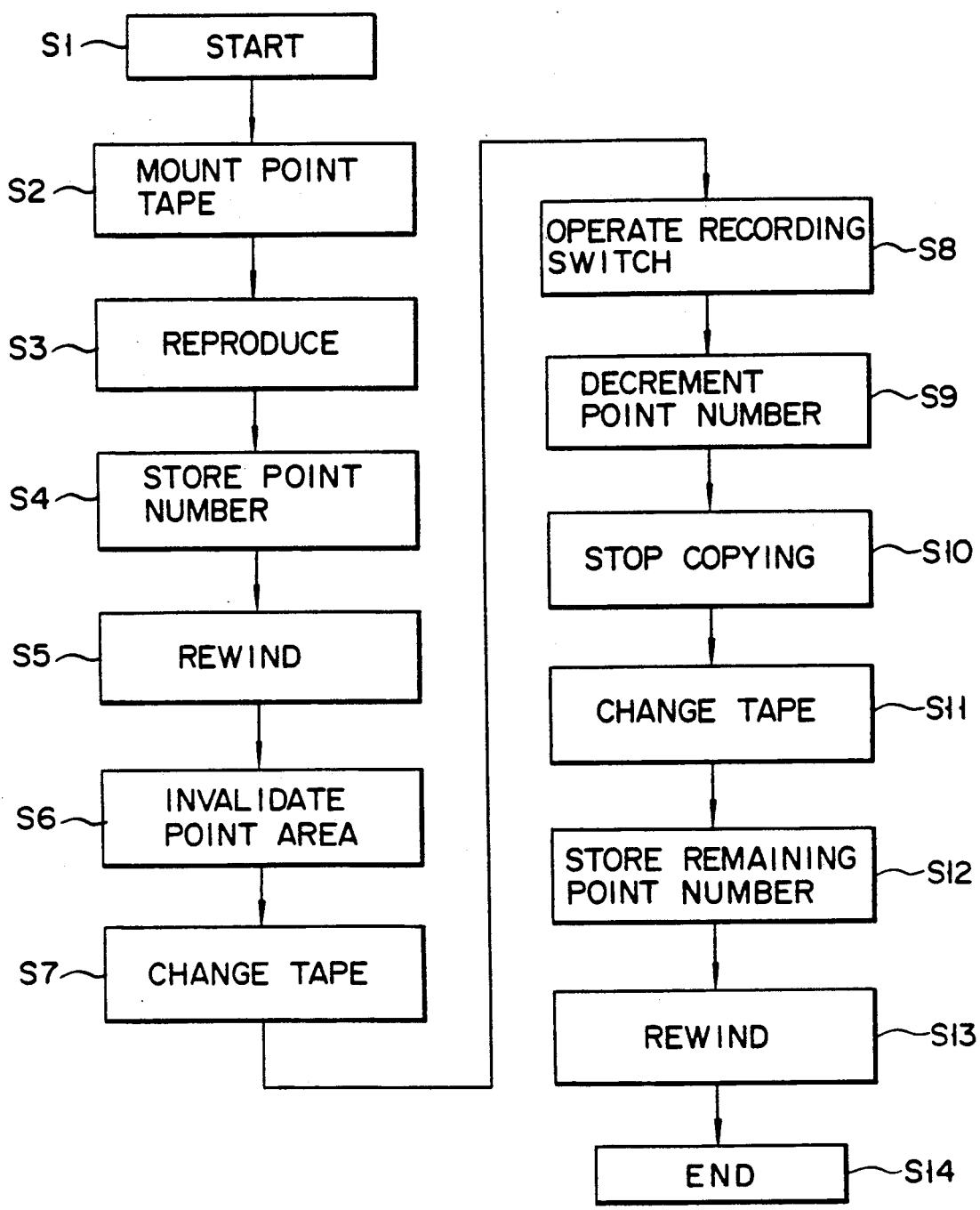
F I G. 3

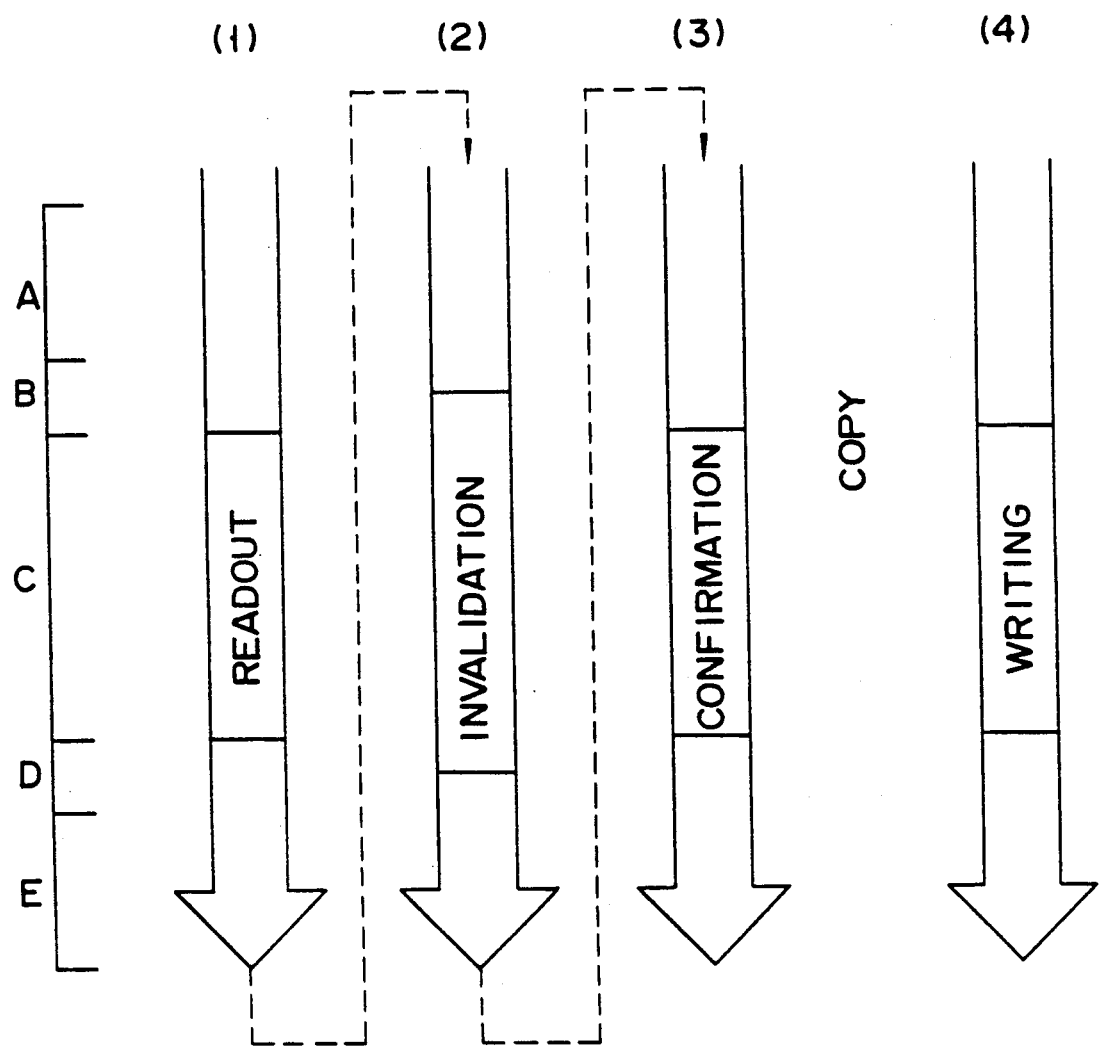
F I G. 4

ITEM = 0111

| PC1 | 0 | 1 | 1 | 1 | (POINT) 0 | 0 | 0 | 0 |
|---|---|---|---|---|---|---|---|---|
| PC2 | 0 | 0 | | | I1 | | | |
| PC3 | 0 | 0 | | | I2 | | | |
| PC4 | 0 | 0 | | | I3 | | | |
| PC5 | 0 | 0 | | | I4 | | | |
| PC6 | 0 | 0 | | | I5 | | | |
| PC7 | 0 | 0 | 0 | 0 | 0 | 0 | 0 | 0 |
| PC8 | PARITY | | | | | | | |
| PC1 | 0 | 1 | 1 | 1 | (POINT) 0 | 1 | 0 | 0 |
| PC2 | | I6 | | | | I7 | | |
| PC3 | | I8 | | | | I9 | | |
| PC4 | | I10 | | | | I11 | | |
| PC5 | | I12 | | | 0 | 0 | 0 | 0 |
| PC6 | 0 | 0 | 0 | 0 | 0 | 0 | 0 | 0 |
| PC7 | 0 | 0 | 0 | 0 | 0 | 0 | 0 | 0 |
| PC8 | PARITY | | | | | | | |

F I G. 5

ITEM = 0111

| PC1 | 0 | 1 | 1 | 1 | (POINT) | 1 | 0 | 0 | 0 |
|---|---|---|---|---|---|---|---|---|---|
| PC2 | V | C | | | 11 | | | | |
| PC3 | 0 | 0 | | | 12 | | | | |
| PC4 | V | 0 | | | 13 | | | | |
| PC5 | 0 | 0 | | | 14 | | | | |
| PC6 | 0 | 0 | | | 15 | | | | |
| PC7 | CP1 |||||||||
| PC8 | PARITY |||||||||
| PC1 | 0 | 1 | 1 | 1 | (POINT) | 1 | 1 | V | P |
| PC2 | 16 |||| 17 |||||
| PC3 | 18 |||| 19 |||||
| PC4 | 110 |||| 111 |||||
| PC5 | 112 |||| 0 | 0 | 0 | 0 ||
| PC6 | 0 | 0 | 0 | 0 | 0 | 0 | 0 | 0 |
| PC7 | CP2 |||||||||
| PC8 | PARITY |||||||||

| POINT | HIGHER 2 BITS OF PC2 (VC) | HIGHER 2 BITS OF PC4 (VO) | LOWER 2 BITS OF PC1 (VP) | COUNTRY CODE | COPYRIGHT HOLDER CODE | RECORDING YEAR | RECORDING NUMBER |
|---|---|---|---|---|---|---|---|
| 1 | 1 | 1 | 1 | X | | | |
| 0 | 0 | 0 | 0 | O | | | |
| 1 | 1 | 1 | 1 | | X | | |
| 0 | 0 | 0 | 0 | | O | | |
| 1 | 1 | 1 | 1 | | | X | X |
| 0 | 0 | 1 | 1 | | | O | X |
| 1 | 1 | 0 | 1 | | | X | O |
| 0 | 0 | 0 | 1 | | | O | O |

O : VALID
X : INVALID

ITEM = 0001

| PC1 | 0 | 0 | 0 | 1 | 0 | PNO-1 |
|-----|---|---|---|---|---|-------|
| PC2 | PNO-2 | | | PNO-3 | | |
| PC3 | X (INDEX) | | | | | |
| PC4 | H (HOUR) | | | | | |
| PC5 | M (MINUTE) | | | | | |
| PC6 | S (SECOND) | | | | | |
| PC7 | F (FRAME) | | | | | |
| PC8 | PARITY | | | | | |

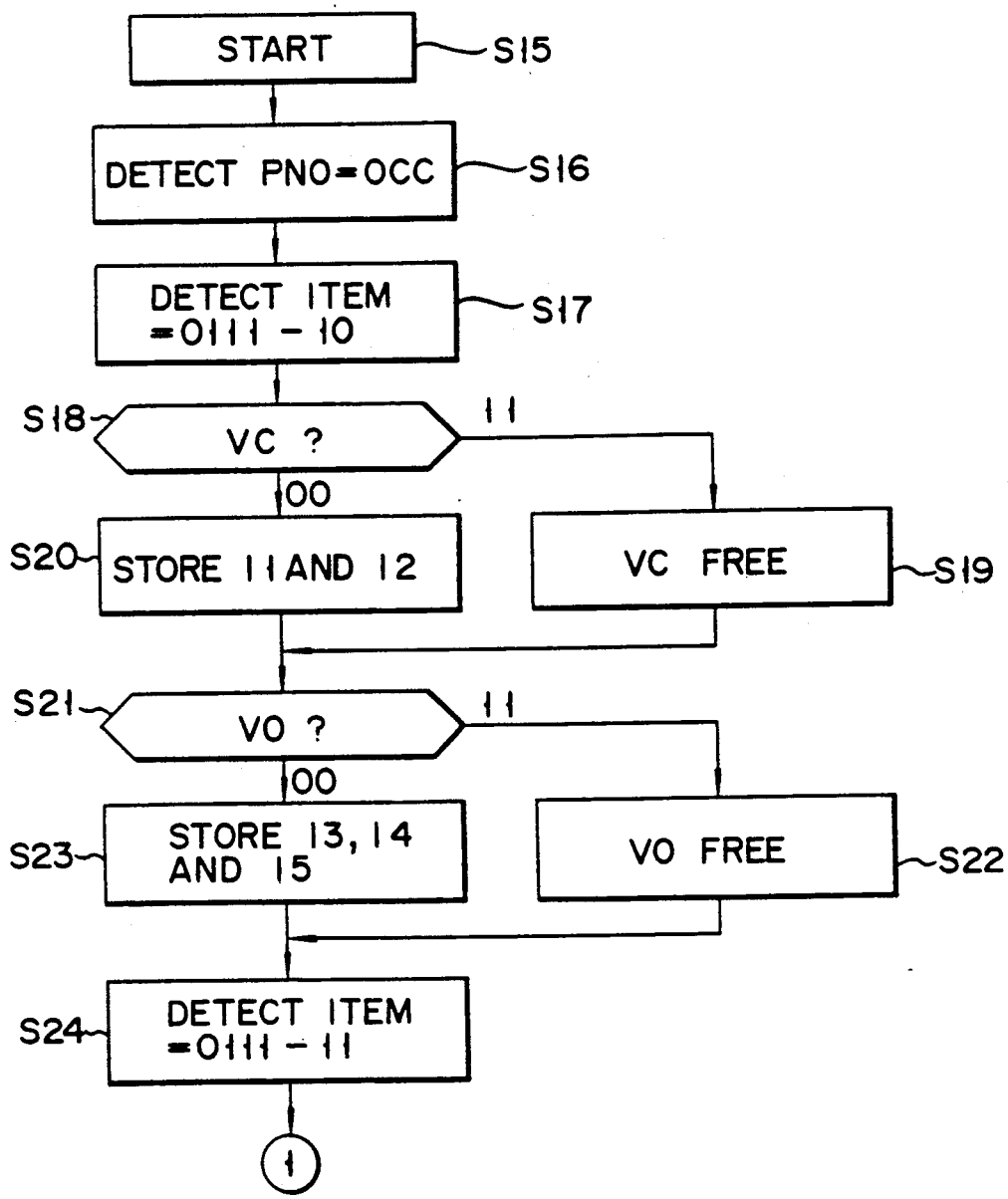
F I G. 10

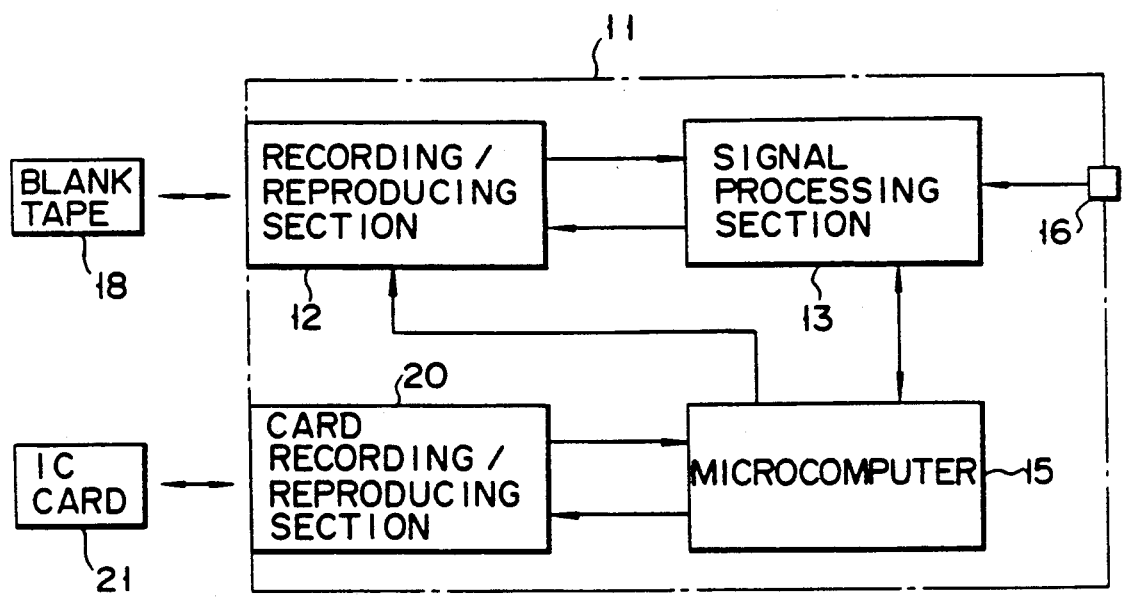
F I G. 15

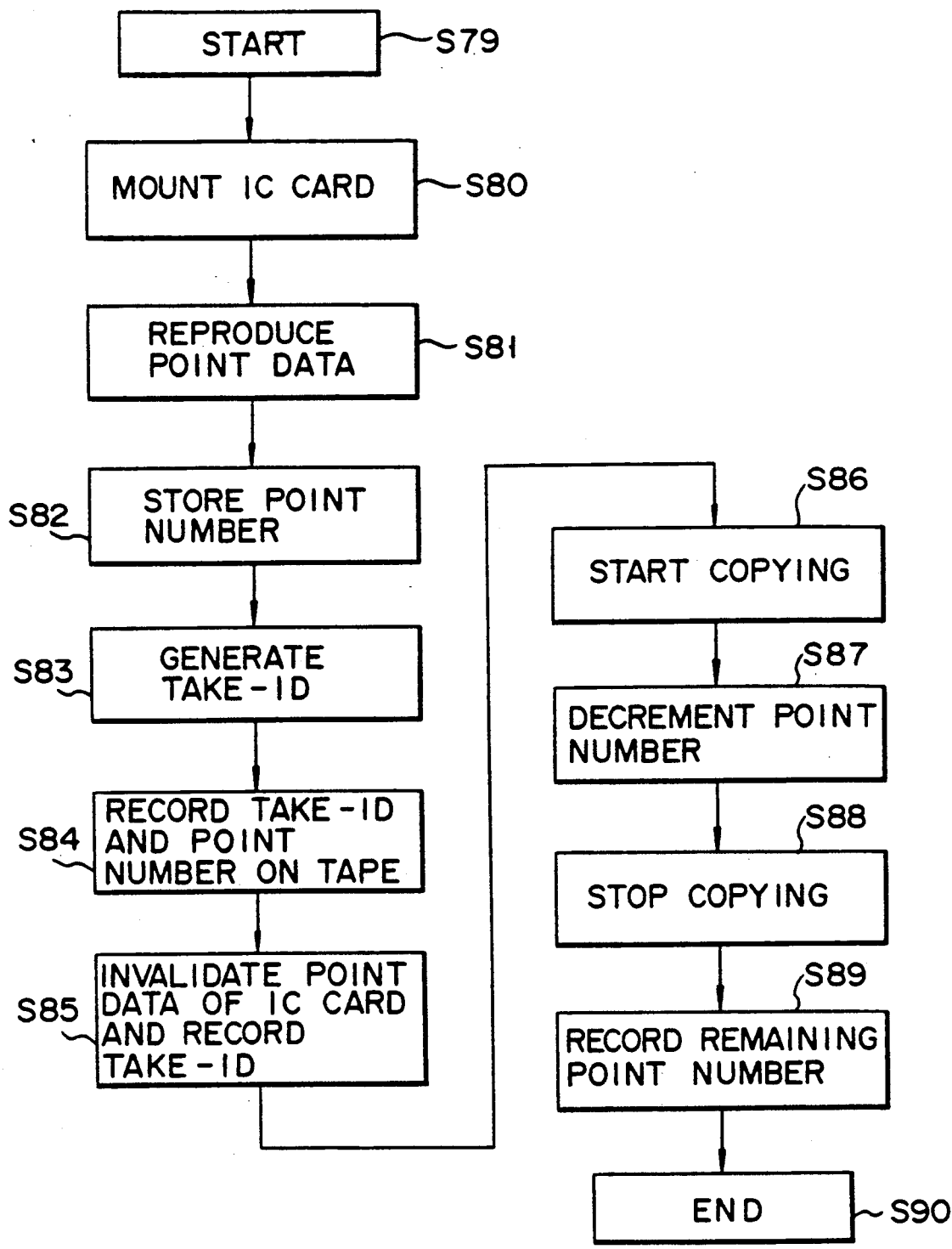
F I G. 17

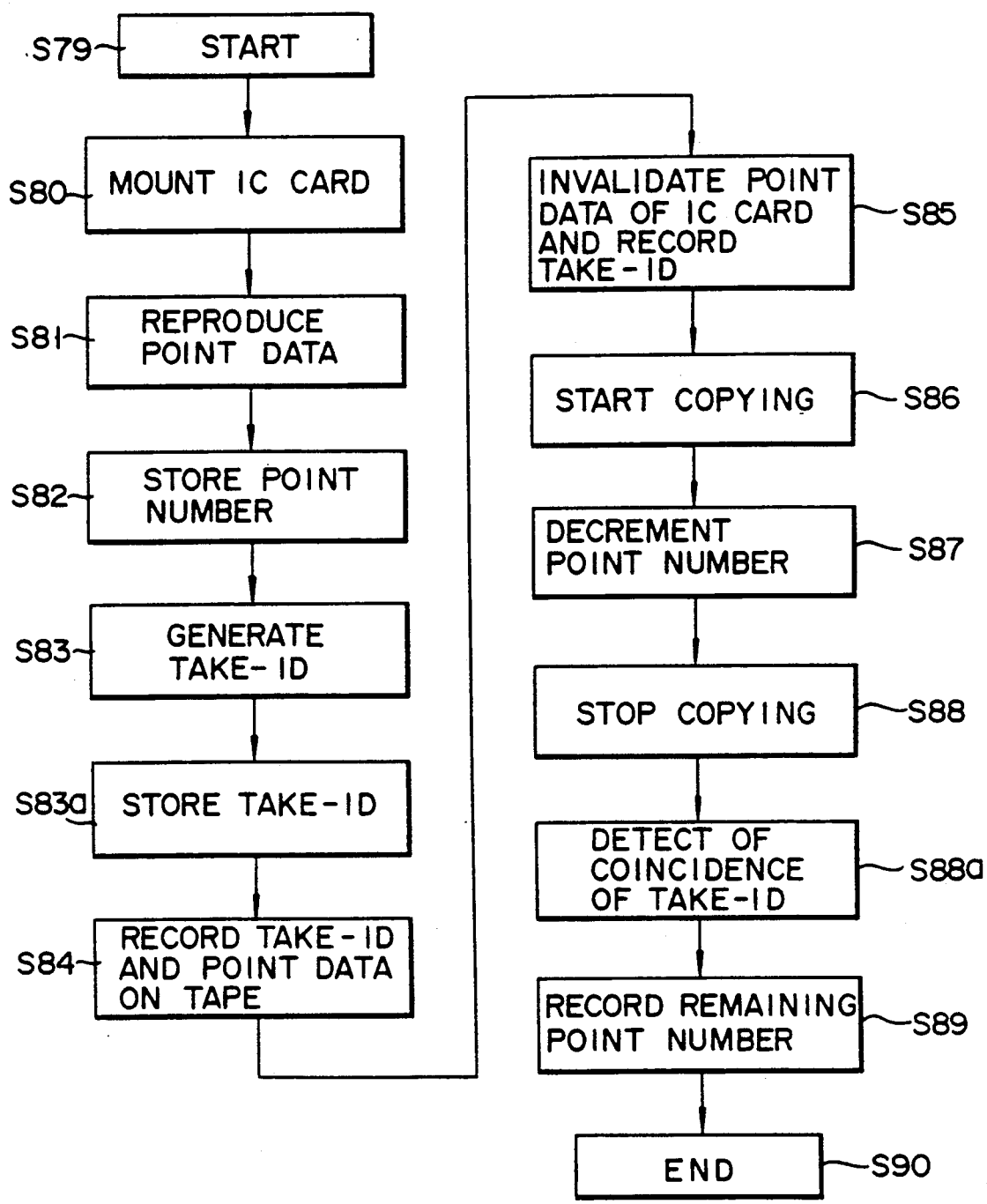
F I G. 19

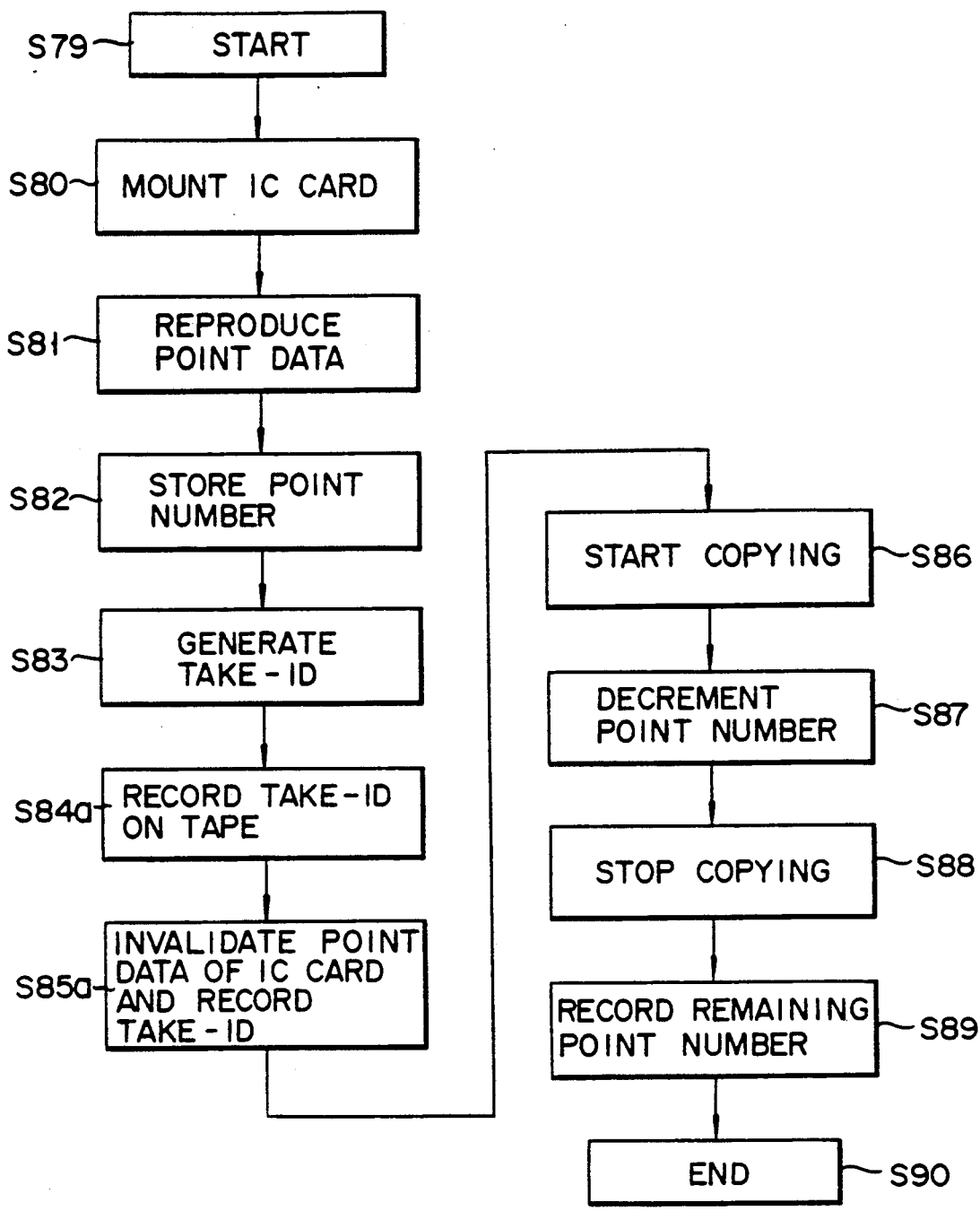
F I G. 22

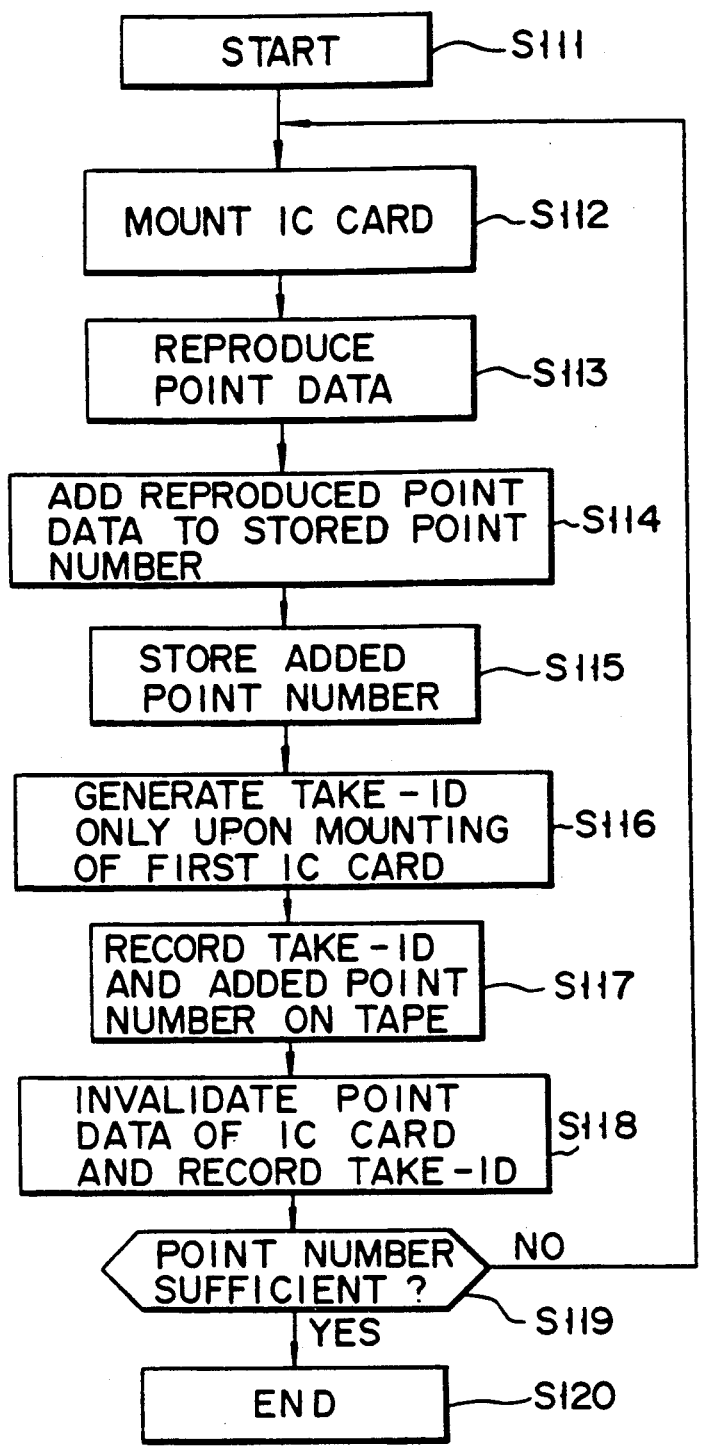
F I G. 24

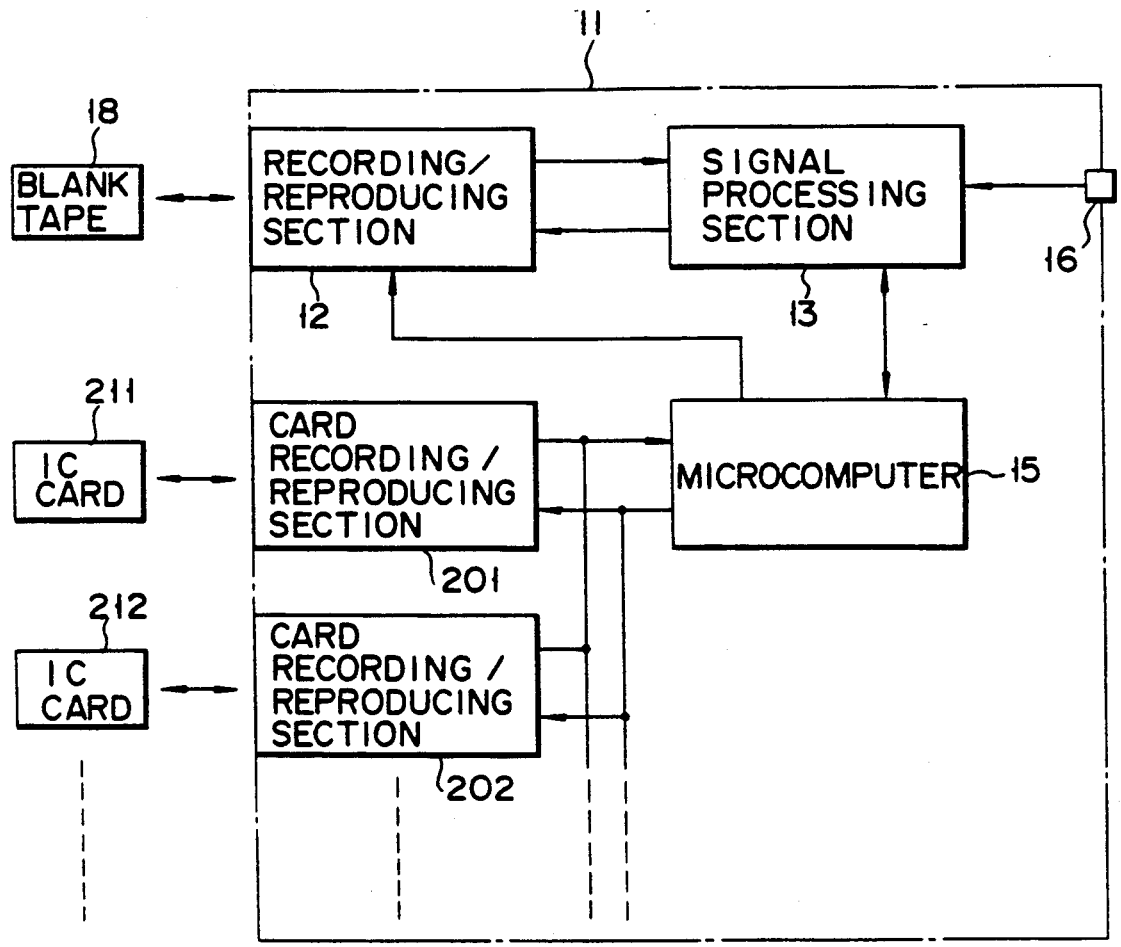
F I G. 25

RECORDING CONTROL APPARATUS

This is a continuation of application Ser. No. 07/214,129, filed June 30, 1988, now U.S. Pat. No. 4,965,680.

BACKGROUND OF THE INVENTION

1. Field of the Invention

The present invention relates to a recording/ reproducing system for, for example, a digital audio tape recorder, which can record input image signals such as audio and image signals on a given recording medium, and, more particularly, to an improvement of a recording control apparatus which can release a recording restriction such as copy inhibition given to an input information signal under a specific condition.

2. Description of the Related Art

In the field of audio equipment, digital recording/reproducing systems are popular, which convert an information signal such as an audio signal into digital data, record the data on a recording medium such as a disk or tape and reproduce the recorded data therefrom as desired, and compact disk players and digital audio tape recorders are leading today.

Available compact disks having music information, etc. recorded in advance, also have copy inhibition data recorded together with the music information in order to prevent unauthorized copying to thereby protect the copyright. With this design, even if one tries to carry out digital recording of digital reproduction data of a compact disk using a digital audio tape recorder, a microcomputer in the tape recorder detects the copy inhibition data to thereby automatically prevent the recording.

For a copy protection purpose, digital audio tapes are also designed to have copy inhibition data recorded thereon to prevent digital recording of reproduction data of the digital audio tapes using a digital audio tape recorder.

However, there is a demand from users that copying of a compact disk or a digital audio tape for private use be allowed since an excellent copy without degradation of a sound quality can be attained by digital recording of digital reproduction data of the disk or tape using a digital audio tape recorder. In this respect, means for using copy inhibition data for unrestricted inhibition of copying needs to be reconsidered.

SUMMARY OF THE INVENTION

Accordingly, it is an object of this invention to provide a recording control apparatus which permits a user at due cost to release copying restriction to easily make a copy.

According to one aspect of this invention, there is provided a recording control apparatus which comprises:

a first recording medium capable of recording an information signal;

a recording device for recording the information signal on the first recording medium;

a restriction circuit for restricting the recording of the information signal on the first recording medium;

a release-signal-holding medium having a release signal for releasing the recording restriction of the restriction circuit; and a releasing circuit for releasing the recording restriction of the restriction circuit based on the release signal of the release-signal-holding medium.

BRIEF DESCRIPTION OF THE DRAWINGS

FIG. 3 is a flowchart for explaining the operation of the embodiment;

FIG. 4 is a diagram for explaining data recording/ reproduction on the point tape;

FIG. 5 is a diagram illustrating a format of sub codes for specific data;

FIG. 6 is a diagram illustrating a format of sub codes for specific data, which is modified for this embodiment;

FIG. 7 is a diagram for explaining validation and invalidation of specific data;

FIGS. 10 through 14 are flowcharts for explaining the detailed operation of this embodiment in consideration of specific data;

FIG. 15 is a block diagram illustrating a recording control apparatus using an IC card as a recording medium of point data;

FIGS. 17 and 18 are flowcharts for explaining the operation with the IC card in use for preparation of power failure;

FIGS. 19 through 23 are flowcharts illustrating modifications of the power failure measurement;

FIG. 24 is a flowchart for explaining the operation for coupling point numbers in point data; and FIG. 25 is a block diagram illustrating a modification of the point-number coupling means.

DETAILED DESCRIPTION OF THE PREFERRED EMBODIMENTS

Figure 1:
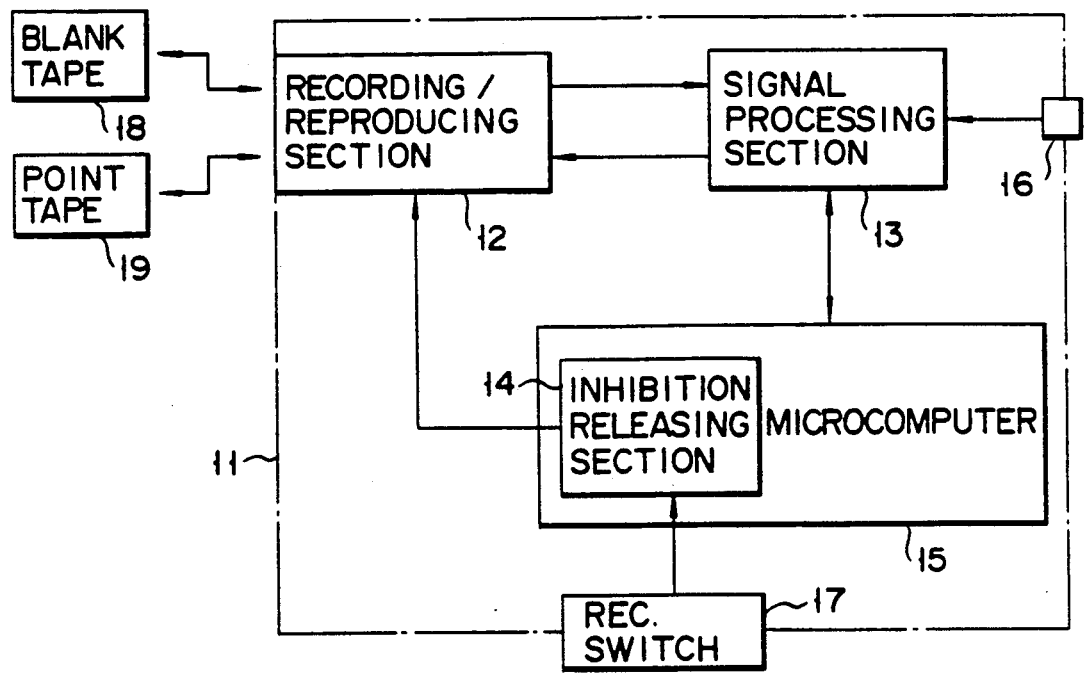
FIG. 1 is a block diagram illustrating a recording control apparatus according to one embodiment of this invention.

One embodiment of this invention will now be explained in detail referring to the accompanying drawings. In FIG. 1 numeral 11 is a digital audio tape recorder which comprises a recording/reproducing section 12, a signal processing section 13 and a microcomputer 15 with a built-in inhibition releasing section 14. Numeral 16 in this diagram is an input terminal which is supplied with digital reproduction data from a compact disk player, another digital audio tape recorder or a satellite broadcast receiver (all not illustrated). Numeral 17 denotes a recording switch.

A blank tape 18 with no information signal recorded thereon and a point tape 19 having copy restriction removing data and specific data recorded thereon (a detailed description of these data will be given later) are selectively mounted in recording/reproducing section 12. Since recording/reproducing section 12 has a function for executing a recording/reproducing operation on a single tape mounted therein, a tape is used as a recording medium on which the copy restriction releasing data and specific data are recorded and the recording/ reproducing of reproduction data of this tape is performed using the recording/reproducing section 12.

This simplifies the structure of the recording control apparatus.

Assume that digital reproduction data having no copy inhibition data is supplied to input terminal 16. This data is then supplied through signal processing section 13 to recording/reproducing section 12 and microcomputer 15. In this case, since microcomputer 15 does not detect copy inhibition data, it generates a release signal and supplies it through inhibition releasing section 14 to recording/reproducing section 12. If blank tape 18 is mounted in recording/reproducing section 12 and recording switch 17 is operated, the digital reproduction data is recorded on blank tape 18 to provide a copy.

Assume now that digital reproduction data with copy inhibition data is supplied to input terminal 16. Then, microcomputer 15 detects the copy inhibition data generates an inhibit signal and supplies it through inhibition releasing section 14 to recording/reproducing section 12. Consequently, even the operation of recording switch 17 does not operate recording/reproducing section 12, thus allowing no data recording.

Figure 2:
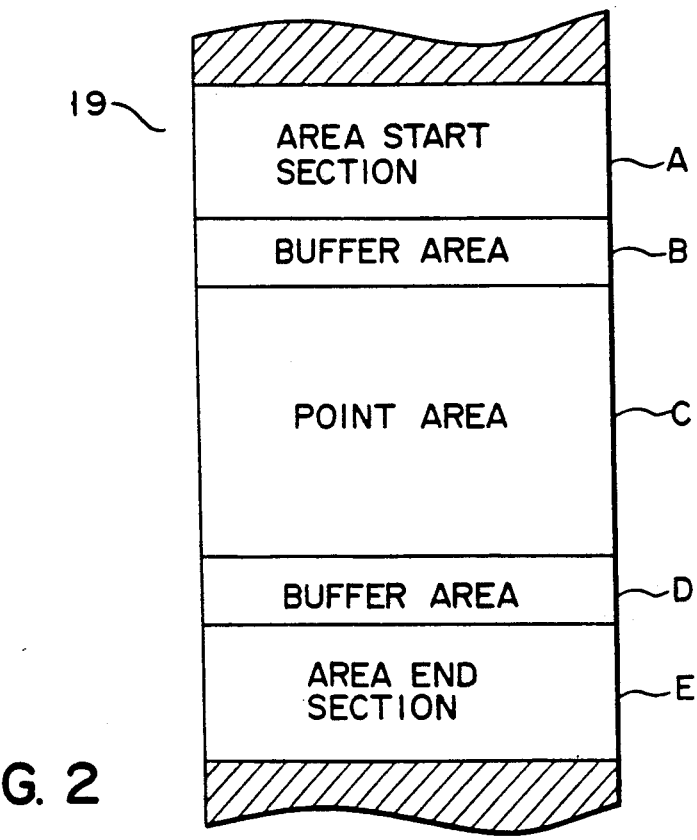
FIG. 2 is a diagram illustrating a data format of a point tape used in the embodiment.

The following explains the operation for releasing copy inhibition using point tape 19. As shown in FIG. 2 point tape 19 is provided with an area start section A, a buffer area B, a point area C, a buffer area D and an area end section E. Area start section A has data recorded which indicates point area C starts, and area end section E has data recorded which indicates that point area C ends. Buffer areas B and D respectively provide rooms between area start section A and point area C and point area C and area end section E.

Point area C has point data recorded therein, which serves to release copy inhibition as well as to restrict the time during which a copy can be made with the copy inhibition released. The following description is given with reference to the case in which the recorded point data allows for making a copy of 60 points each point corresponding to one minute, i.e., the recorded point data allows for a 60-minute copy.

Suppose that digital reproduction data with copy inhibition data has been supplied to input terminal 16, and microcomputer 15 has detected the copy inhibition data and outputted an inhibit signal through inhibition releasing section 14 to recording/reproducing section 12. If the operation shown in FIG. 3 is started (step S1) in this state, a user mounts point tape 19 in recording/reproducing section 12 in step S2 and operates a reproducing switch (not shown) to set a reproduction mode in step S3.

Then, point tape 19 is reproduced in recording/reproducing section 12 and the contents of the tape are supplied through signal processing section 13 to microcomputer 15, which in turn controls recording/reproducing section 12 to reproduce point tape 19 from area start section A to area end section E and stores a point number, which is recorded in point area C at step S4, in the memory (not shown) incorporated in microcomputer 15.

Microcomputer 15 then controls recording/reproducing section 12 to rewind point tape 19 to area start section A in step S5 and controls recording/reproducing section 12 to write, for example, all "0" in point area C to invalidate the content of point area C in step S6. Then, microcomputer 15 causes point tape 19 to be rewound again to area start section A and reproduced therefrom to confirm that the invalidation of the content of point area C, and controls inhibition releasing section 14 to generate a release signal, thereby releasing the copy inhibition.

Then, the user removes point tape 19 and mounts blank tape 18 in recording/reproducing section 12 in step S7 and operates recording switch 17 in step S8. Accordingly, the digital reproduction data supplied to input terminal 16 is copied on blank tape 18.

In step S9, microcomputer 15 measures the time during which the copying is performed, i.e., the time during which recording switch 17 is in its operated state, and decrements the point number (stored in the memory incorporated in microcomputer 15, in step) S4 by one upon each elapse of one minute. If the point number becomes "0," microcomputer 15 causes inhibition releasing section 14 to generate an inhibit signal to recording/reproducing section 12 to inhibit the copying operation.

When the copying is completed before the point number becomes "0," the user operates a stop switch (not shown) in step S10 to stop the recording operation, i.e., the copying operation, and removes blank tape 18 and mounts point tape 19 in recording/reproducing section 12 in step S11.

Microcomputer 15 sets recording/reproducing section 12 in a recording mode and records point data having the remaining point number resulting from the subtraction carried out in step S9 in point area C of point tape 19 in step S12. For instance, the copying is performed for 20 minutes, the point number 40 is written on point tape 19.

Then, microcomputer 15 controls recording/reproducing section 12 to rewind point tape 19 to area start section A in step S13, thus completing the operational sequence of releasing the copy inhibition using point tape 19 and copying the digital reproduction data supplied to input terminal 16 on blank tape 18 (step S14).

FIG. 4 gives a detailed illustration of the recording/reproducing operation on point tape 19 in the aforementioned steps S2–S6 and S12. When point tape 19 is mounted in recording/reproducing section 12 in step S2, as shown in FIG. 4(1), point tape 19 is reproduced from area start section A to area end section E and point data recorded in point area C is stored in microcomputer 15.

Thereafter, point tape 19 is rewound to area start section A, all "0" is recorded in a region including the entire point area C and slight portions of buffer areas B and D to invalidate point area C as shown in FIG. 4(2). Then, point tape 19 is rewound again to area start section A and the complete invalidation of point area C is confirmed, as shown in FIG. 4(3). Then, microcomputer 15 releases the copy inhibition to allow for the copying operation.

When point tape 19 is mounted again in step S11, the subtracted point number or the updated point data is written in point area C of point tape 19, as shown in FIG. 4(4).

With the above structure, by purchasing point tape 19, the user can easily copy digital reproduction data for a given period of time and pays a royalty directly or indirectly to the copyright holder, thus copyrighting the holder's product.

In addition, since the copy inhibition is released after point data is read out from point tape 19 and point area C of the tape 19 is invalidated, this point tape 19 becomes invalid unless point data with the point number updated is recorded upon completion of the copying operation, thus preventing an unauthorized use of point tape 19. If the point data of point tape 19 is not invalidated, the point data is not updated when point tape 19 with its point data read out is removed from recording-/reproducing section 12. Consequently, unauthorized, unlimited copying can be carried out by repeatedly using the same point tape 19 in this manner.

Although this method can prevent point tape 19 from being removed with the point data read out, this prevention is effective as long as digital audio tape recorder 11 is operated from the outside of the cabinet; the aforementioned unauthorized use can be easily made by the user taking the tape recorder apart and operating it.

An explanation of the above-mentioned specific data will now be given. In a source tape available on market for use in a digital audio tape recorder, on which a music is recorded, for example, specific data for specifying various items regarding an information signal recorded on the source tape is recorded in sub codes. FIG. 5 illustrates the format of the sub codes associated with the specific data, which is determined on the basis of the ISRC (International Standard Recording Code).

There are four types of items specified for the information signal, namely, a country code I1 and I2 representing a country in which, for example, a music is produced, by a two-digit alphanumeral consisting of PC2 and PC3, a copyright holder code I3-I5 representing a copyright holder by a three-digit alphanumeral consisting of PC4-PC6, a recording year I6 and I7 indicated by a two-digit BCD code consisting of PC2, and a recording number I8-I12 indicated by a five-digit BCD code consisting of PC3-PC5.

According to the format for a digital audio tape recorder, when the upper six bits of PC1 is "011100," country code I1 and I2 and copyright holder code I3-I5 are written, and when the upper six bits of PC1 is "011101," recording year I6 and I7 and recording number I8-I12 are written.

According to this embodiment, the format shown in FIG. 5 is modified for point tape 19 as shown in FIG. 6. Specifically, when the upper six bits of PC1 is "01110," country code I1 and I2 and copyright holder code I3-I5 are written, and the validity of recording year I6 and I7 and recording number I8-I12 is indicated by the upper two bits VC and VO of PC2 and PC4 as shown in FIG. 7. Point numbers CP1 and CP2 are recorded in PC7, the latter number CP2 having priority over the former number CP1.

Figures 8, 9:
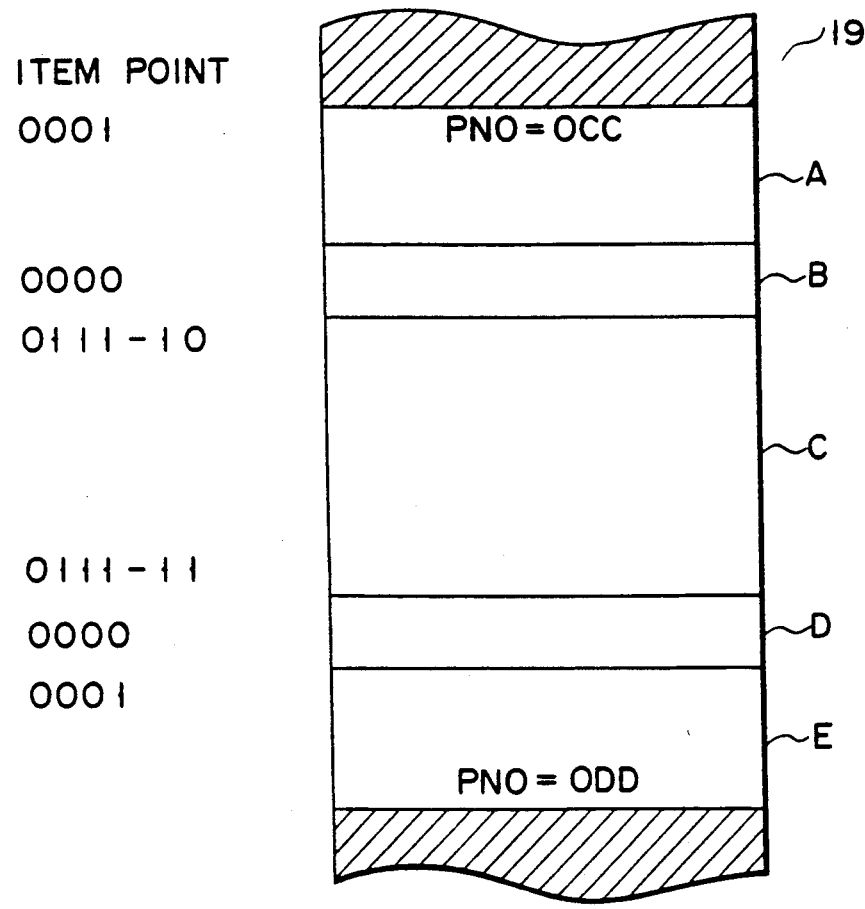
FIG. 8 is a diagram for explaining part of a sub code format corresponding to a program time mode.
FIG. 9 is a diagram illustrating a modified data format of a point tape for this embodiment.

FIG. 8 illustrates part of the sub code format in a digital audio tape recorder, which is a program time mode. In this diagram, although PNO-1, PNO-2 and PNO-3 indicate a program number, OAA, OBB and OEE are separately defined.

According to this embodiment, OCC and ODD are further set in association with the start point of area start section A and the end point of area end section E, respectively. When the upper four bits (item) of PC1 is "0000," it is a sub-code less mode and it is determined that all "0" should be written. As described above, four types of specific data are recorded in point area C of point tape 19 in association with the specific data representing the four types of items to be recorded in the sub codes of the source tape, and point tape 19 actually has the format as shown in FIG. 9.

In this case, the size of each area is set to, for example, four frame (one frame being 30 msec), and 448 packs each consisting of PC1-PC8 can be recorded in one frame. With this design, the redundancy is increased, but such is intended to include a mechanical stable time and thus provide a sufficient reliability.

Figure 11:
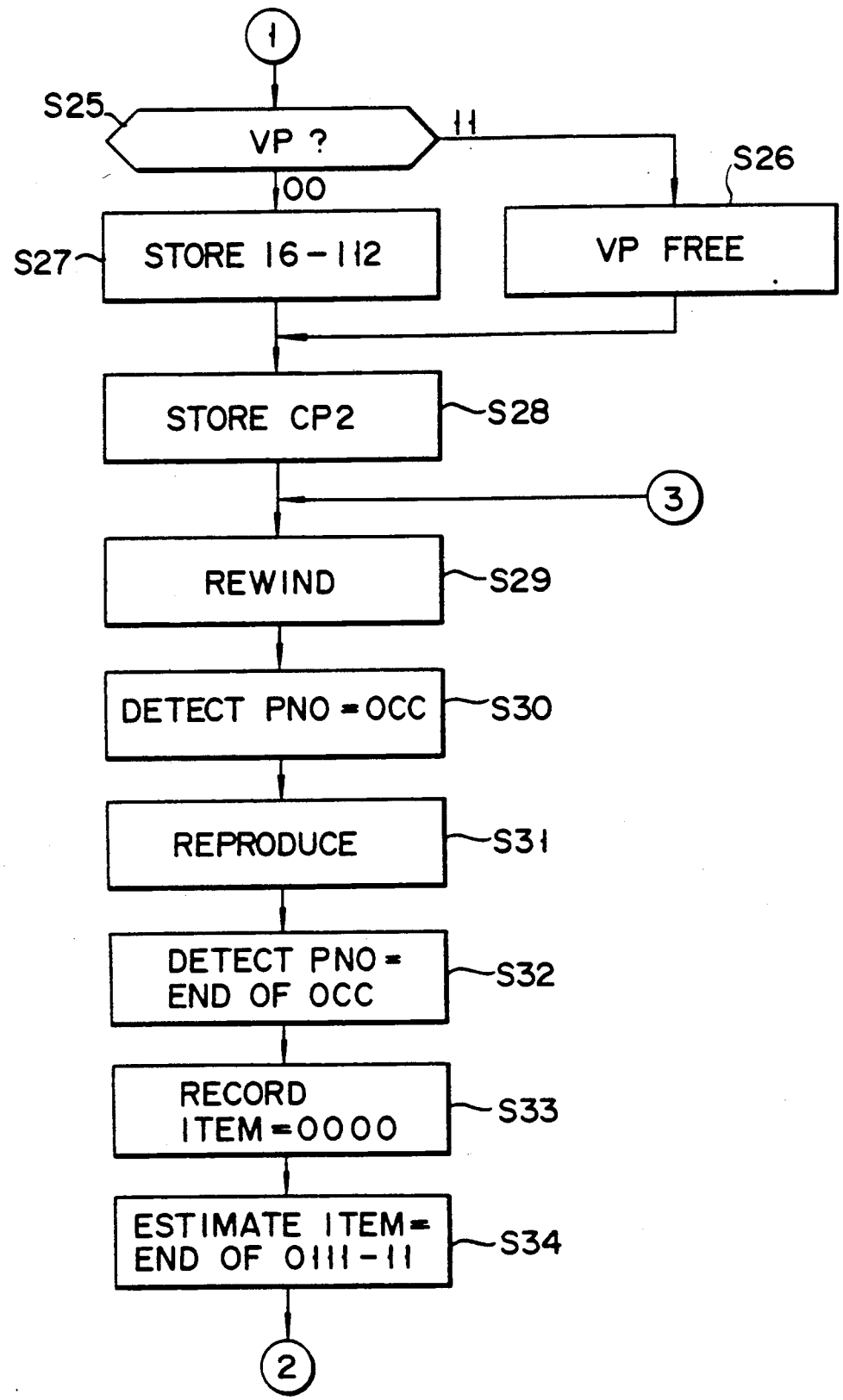
Figure 12:
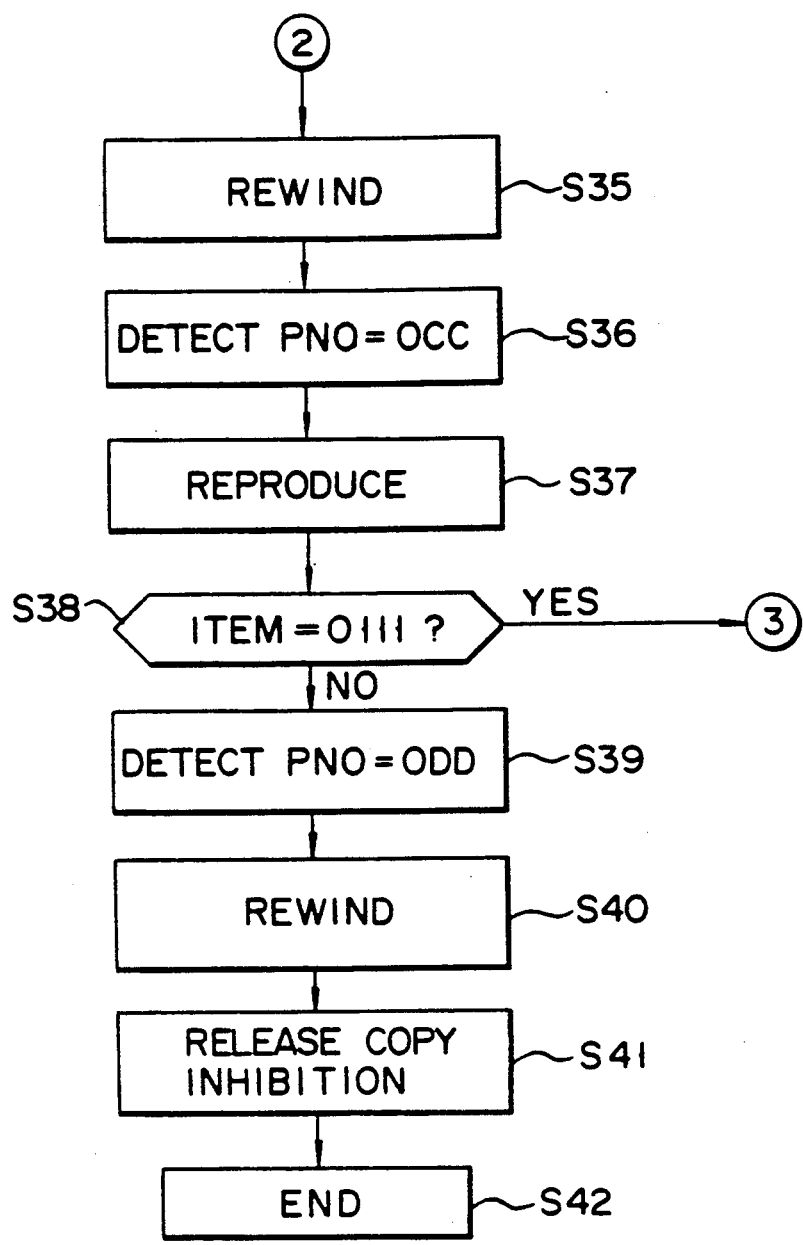

The operation of the recording control apparatus with the above specific data in consideration will now be explained. FIG. 10-12 illustrate the operations corresponding to the aforementioned steps S2-S6 of FIG. 3. Reproduction of point tape 19 starts at step S15, and it is detected in step S16 that PNO becomes OCC. When the item is detected to be "0111-10" in step S17, it is discriminated in the next step S18 whether the upper two bits VC of PC2 is "11" or "00."

If VC is "11," the country code is invalid as is apparent from FIG. 7, so that VC is set free in step S19. On the other hand, if VC is "00," the country code is valid and I1 and I2 are stored in step S20.

In the next step S21, it is discriminated whether the upper two bits VO of PC4 is "11" or "00"; if VO is "11," the copyright holder code is invalid so that VO is set free in step S22, and if VO is "00," it is valid so that I3-I5 are stored in step S23.

When the item is detected to be "0111-11" in step S24, it is discriminated whether the lower two bits VP of PC1 is "11" or "00." If VP is "11," both the recording year and recording number are invalid so that VP is set free in step S26. If VP is "00," the recording year and recording number are both valid so that I6-I12 are stored in step S27.

Then, point number CP2 is stored in step S28 so that valid specific data and point number are stored in microcomputer 15.

Then, point tape 19 is rewound in the next step S29 and is set again in the reproduction mode in step S31 when PNO is detected to be OCC in step S30. And, when PNO is detected to be the end of OCC in step S32, "0000" is stored in the item in step S33, thus invalidating the specific data and point data recorded on point tape 19.

In the above state, when it is estimated in step S34 that the item reaches the end of "0111-11," point tape 19 is rewound again in step S35. When PNO is detected to be OCC in step S36, point tape 19 is set in the reproduction mode in step S37 and it is discriminated in step S38 whether or not a part of the item is "0111."

If it is detected in step S37 that a part of the item is "0111" (YES), the flow returns to step S29 and invalidation of the recorded content is executed thereafter. If, on the other hand, no part of the item is detected to be "0111" (NO) in step S38, the flow advances to step S39. When PNO is detected to be ODD in step S39, point tape 19 is rewound in step S40 microcomputer 15 removes the copy inhibition in step S41, thus completing the operation (step S42).

Figure 13:
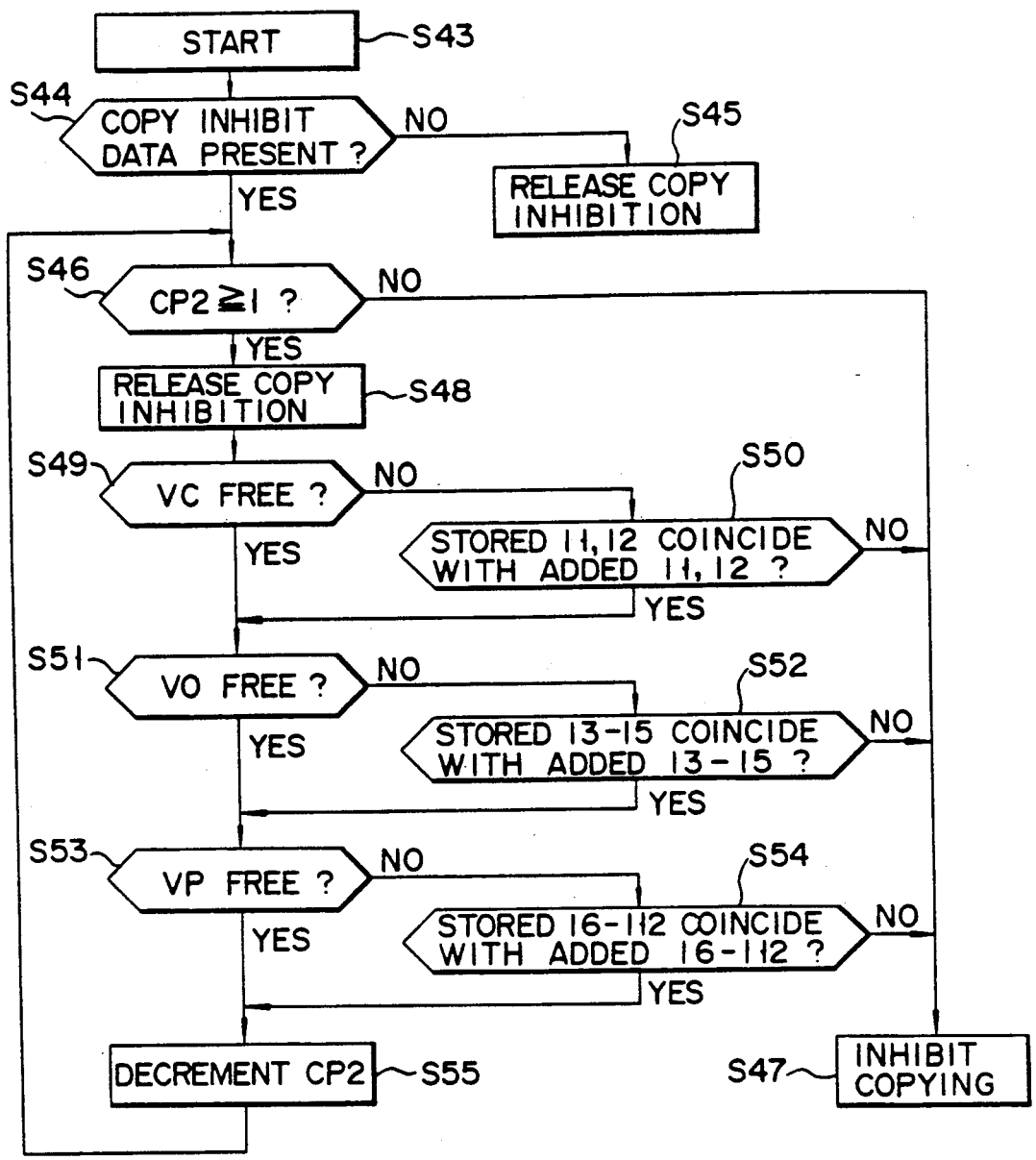

FIG. 13 illustrates the operation involved in making a copy. When a copying operation starts (step S43), it is discriminated in step S44 whether or not copy inhibition data is affixed to an input information signal. If such data is not affixed (NO), the copy inhibition is released without conditions in step S45, and if it is affixed (YES), it is discriminated in step S46 whether or not point number CP2 read out from point tape 19 is greater than or equal to 1.

If point number CP2 is not greater than or equal to 1 (NO), the copying is inhibited in step S47, and if it is greater than or equal to 1 (YES), the copy inhibition is released in step S48. In the next step S49, it is discriminated whether or not VC read out from point tape 19 is free. If VC is not free (NO), it is discriminated in step S50 whether or not previously stored country code I1 and I2 coincides with the country code I1 and I2 affixed to the input information signal. If coincidence is not detected (NO), the copying inhibited in step S47.

If VC is free or coincidence of two country codes I1 and I2 is detected, it is discriminated in step S51 whether or not VO previously read out from point tape 19 is free. If VO is not free (NO), it is then discriminated in step S52 whether or not previously stored copyright holder code I3–I5 coincides with the copyright holder code I3–I5 affixed to the input information signal. If no coincidence is attained (NO), the copying is inhibited in step S47.

If VO is free or coincidence of two copyright holder codes I3–I5 is detected, it is discriminated in step S53 whether or not VP previously read out from point tape 19 is free. If VP is not free (NO) it is then discriminated in step S54 whether or not previously stored recording year and recording number I6–I12 coincides with the recording year and recording number I6–I12 affixed to the input information signal. If no coincidence is attained (NO), the copying is inhibited in step S47.

If the VP is free or coincidence of two recording years and recording numbers I6–I12 is attained, point number CP2 is decremented by one every type the copying time elapses one minute in step S55 and the flow returns to step S46. Accordingly, when VC, VO and VP are all free or coincidence in the country code, copyright holder code or recording year and recording number is attained, a copy can be made.

Figure 14:
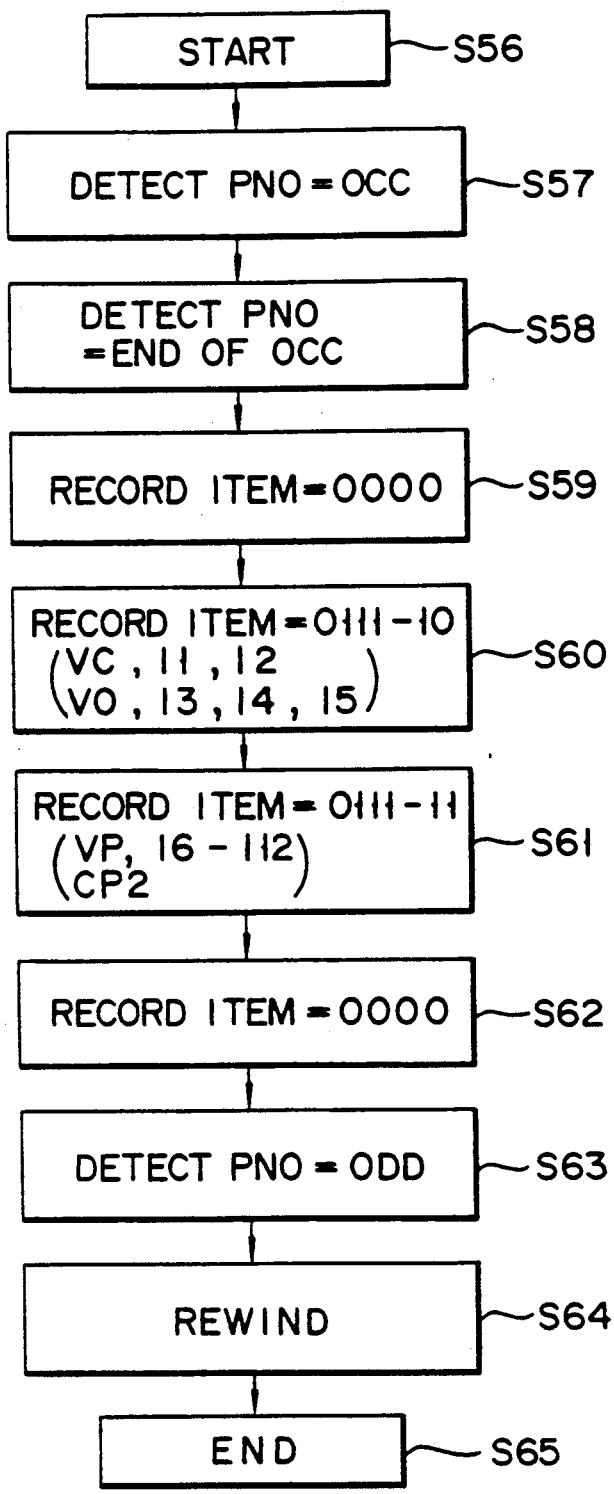

FIG. 14 illustrates the operation for restoring the content of point tape 19 upon completion of the copying operation. When the copying operation is completed and point tape 19 is mounted again in recording/reproducing section 12 to start the restoring operation (step S56), it is detected in step S57 that PNO is OCC and the end of OCC is detected in step S58. In the next step S59, "0000" is stored in the item to thereby form buffer area B. In the next step S60, "0111-10", i.e., the previously stored VC, VO and I1–I5 are stored in the item.

In the subsequent step S61, "0111-11", i.e., the previously stored VP, I6–I12 and subtracted point number CP2 are stored in the item and "0000" is stored in the item in step S62 to thereby form buffer area D. When PNO is detected to be ODD in step S63, point tape 19 is rewound in step S64, which completes the restoring operation (step S65).

With the above arrangement, since the copy inhibition is released only when VC, VO and VP are all free or the country code, copyright holder code or recording year and recording number recorded on point tape 19 coincides with the country code, copyright holder code or recording year and recording number affixed to the input information signal, the proper royalty can be paid to the copyright holder of the copied information.

In the above description, blank tape 18 and point tape 19 are separately provided; however, if copy restriction removing data is recorded on blank tape 18, for example, a single tape is sufficient for the aforementioned operation and no tape replacement is necessary.

Further, the copy restriction releasing data may be recorded on a source tape available on market on which an information signal such as a music is recorded. In this case, as mentioned earlier, it is necessary to selectively mount blank tape 18 with the source tape in recording-/reproducing section 12. While the source tape is mounted in recording/reproducing section 12 to execute the necessary processing on the point data, it is unnecessary to reproduce the yet uncopied music information of the source tape in another digital audio tape recorder, so that there is no operational inconvenience.

Although the above explanation has been given with reference to the case where a tape is used as a recording medium for the copy restriction releasing data and specific data, the recording medium is in no way limited to a tape but may well be a card which can be subjected to magnetic recording/reproducing of information. The use of such a card requires provision of a device for performing recording/reproducing on the card in digital audio tape recorder 11. Since the card, once mounted, need not be removed until the copying operation is completed, however, the aforementioned tape replacement between blank tape 18 and point tape 19 is unnecessary, thus facilitating the copying operation.

FIG. 15 illustrates a recording control apparatus which uses a card as a recording medium on which copy restriction releasing data is recorded. A card recording/reproducing section 20 is provided in digital audio tape recorder 11 and is coupled to microcomputer 15. This card recording/reproducing section 20 is designed to be mounted with an IC (Integrated Circuit) card 21 having point data and specific data as copy restriction releasing data recorded thereon. In this example, the recorded point data allows for 15-point or 15-minute copying. In FIG. 15, recording switch 17 is omitted for the sake of diagrammatic simplicity.

Figure 16:
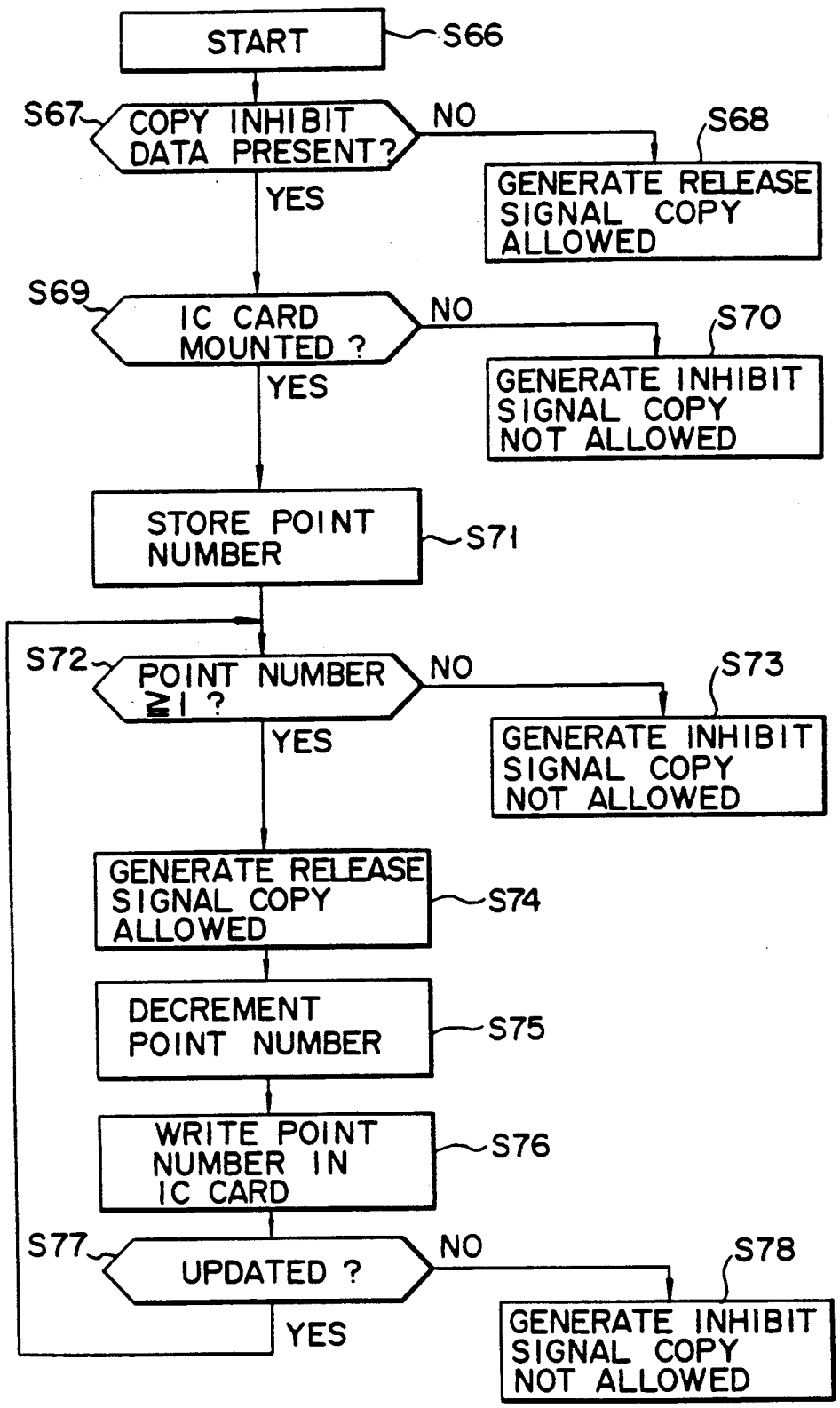
FIG. 16 is a flowchart for explaining the operation with the IC card in use.

With the above arrangement, the operation of the apparatus will be explained with reference to the flowchart shown in FIG. 16. When the operation starts (step S66), microcomputer 15 discriminates in step S67 whether or not the digital reproduction data coming through signal processing section 13 from input terminal 16 includes copy inhibition data.

If no copy inhibition data is detected (NO), microcomputer 15 generates a remove signal to recording/ reproducing section 12 in step S68. Accordingly, operating the recording switch (not shown) after blank tape 18 is mounted in recording/reproducing section 12 causes the digital reproduction data supplied to input terminal 16 to be recorded on blank tape 18 through signal processing 13 and recording/reproducing section 12, thereby making a copy.

If, on the other hand, the copy inhibition data is detected in step S67 (YES), microcomputer 15 discriminates in step S69 whether or not IC card 21 is mounted in card recording/reproducing section 20. If IC card 21 is not mounted (NO), microcomputer 15 generates an inhibit signal to recording/reproducing section 12 in step S70. Consequently, even operating the recording switch does not drive recording/reproducing section 12, thus inhibiting the recording operation.

If the mounting of IC card 21 is detected (YES), microcomputer 15 controls card recording/reproducing section 20 to read out the point number from IC card 21 and stores it in step S71. Then, microcomputer 15 discriminates in step S72 whether or not the stored point number is greater than or equal to 1. If the point number is less than 1 (NO), microcomputer 15 generates the inhibit signal to recording/reproducing section 12 in step S73, thus inhibiting the recording operation.

If, on the other hand, the point number is greater than or equal to 1 (YES), microcomputer 15 generates the release signal to recording/reproducing section 12 in step S74 so that a copy can be made.

With the copying operation being carried out in the above manner, microcomputer 15 decrements the stored point number by one upon every elapse of one minute in step S75. At this time, microcomputer 15 controls card recording/reproducing sec ion 20 in step S76 in such a way that upon decrement of one point, the remaining point number is written on IC card 21. In other words, every time the point number is decremented by one upon elapse of one minute of the copying time, the remaining point number is written on IC card 21; that is, the point number recorded on IC card 21 is updated.

In the next step S77, microcomputer 15 discriminates whether or not the proper point number is written on IC card 21 upon each updating of the point number, i.e., whether or not the point number is properly updated. If the proper updating of the point number is executed (YES), microcomputer 15 returns to step S72 and the above operation is repeated as long as the copying continues. If the point number becomes "0," however, the copying is inhibited in step S73.

If it is discriminated in step S77 that the proper updating of the point number has not been carried out (NO), microcomputer 15 generates the inhibit signal to recording/reproducing section 12 to inhibit the copying operation in step S78.

With the above arrangement, upon each decrement of the point number, the remaining point number is written on IC card 21 and the copying operation is inhibited when the point number cannot be written on IC card. If IC card 21 is removed from card recording-/reproducing section 20 during the copying operation, therefore, the copy inhibition mode is set to thereby prevent unauthorized copying.

That is, with the use of a card as recording medium for the copy restriction releasing data, the card can be subjected to recording/reproducing while data is being recorded on a tape. As described above, therefore, unauthorized copying can be prevented without invalidating the copy restriction releasing data.

The measure for invalidating the copy restriction removing data may also be applied to the case where such a card is used. FIG. 17 illustrates the operation for the case in which IC card 21 is used as a recording medium for the copy restriction releasing data and the invalidation of this data is utilized.

In this example, it is assumed that the point data recorded on IC card 21 allows for 60-point or 60-minute copying. Further assume that digital reproduction data having copy inhibition data has been supplied to input terminal 16 and microcomputer 15 has detected the copy inhibition data and generated an inhibit signal to recording/reproducing section 12.

When the operation starts (step S79), a user mounts IC card 21 in card recording/reproducing section 20 in step S80 and the point data is reproduced in step S81. The reproduced point data is supplied to microcomputer 15 and the point number is stored in the memory incorporated in microcomputer 15 in step S82.

Microcomputer 15 then generates a specific code (hereinafter referred to as TAKE-ID) in step S83 interlocking with the operation of, for example, the recording switch. The TAKE-ID, which is generated upon each generation of a recording request to discriminate that request, may be generated as a sequential number or at random.

In the next step S84, microcomputer 15 controls recording/reproducing section 12 to record TAKE-ID generated by the microcomputer and the point data read out from IC card 21 on blank tape 18. Microcomputer 15 then invalidates the point data recorded on IC card 21 and controls card recording/reproducing section 20 so as to record TAKE-ID on IC card 21 in step S85. The invalidation of the point data can be made by recording all "0" as mentioned earlier or using other various means, such as setting an invalidation flag.

In the subsequent step S86, microcomputer 15 permits recording/reproducing section 12 to start a recording operation upon operating the recording switch so that the digital reproduction data supplied to input terminal 16 is copied on blank tape 18. In step S87, microcomputer 15 measures the copying time, i.e., the time during which the recording switch is in its operated state and decrements the point number, which has been stored in the memory incorporated in microcomputer 15 in step S82, by one upon each elapse of one minute. When the point number becomes "0," microcomputer 15 controls recording/reproducing section 12 to immediately stop the recording operation.

When the copying operation is completed before the point number becomes "0," the user operates a stop switch (not shown) to stop the recording o copying operation. Then, microcomputer 15 sets card recording/ reproducing section 20 in the recording mode to record the point data having the remaining point number, which has been decremented in step S87, on IC card 21 in step S09 For instance, if 20 minutes of copying is performed, the point number "40" is written on card 21 and the operational sequence of releasing the copy inhibition and copying the digital reproduction data supplied to input terminal 16 on blank tape 18 using the card is completed (step S90).

Power failure may occur in the period between the start of copying operation (step S86) and the recording of the remaining point number on IC card 21 (step S89). If such power failure takes places, the contents of the memory incorporated in microcomputer 15, i.e., the point number, will be erased. So, the point number can no longer be recorded on IC card 21. In order to record the point number on IC card 21 even if such power failure occurs, the measures are taken, as will be explained with reference to the flow chart shown in FIG. 18.

When the operation starts (step S91), microcomputer 15 controls recording/reproducing section 12 to read out TAKE-ID and the point data from blank tape 18 in step S92 and stores the point number in step S93. Microcomputer 15 then controls card recording/reproducing section 20 to read out TAKE-ID from IC card 21 in step S94.

Then, microcomputer 15 detects in step S97 that TAKE-IDs read out from blank tape 18 and IC card 21 coincide with each other, and controls recording/reproducing section 12 to reproduce blank tape 18 in step S96.

In the next step S97, microcomputer 15 decrements the point number stored in step S93 by one, every time one minute elapses for the reproduction of blank tape 10. In step S98, microcomputer 15 discriminates whether or not reproduction data is acquired from blank tape 18. In other words, the microcomputer discriminates the time during which data recording on blank tape 10 is performed, between the point when the copying operation starts at step S86 in FIG. 17 and the point when the power failure occurs. This discrimination is made by the user hearing the reproduced sound, or microcomputer 15 detecting the recording magnetic patter of blank tape 18 or the presence/absence of TAKE-ID repeatedly recorded on blank tape 18 during data recording on the tape.

When no more reproduction data is present on blank tape 18 (YES), microcomputer 15 controls recording/reproducing section 12 to stop the reproduction of blank tape 18 in step S99 and controls card recording/reproducing section 20 to write the remaining point number, previously decreased in step S97, on IC card 21 in step S100, thus completing the operation (step S101).

With the above arrangement, as shown in FIG. 17, the point data of IC card 21 is recorded on blank tape 18 and the specific code, TAKE-ID, used for discrimination of a recording request is recorded on blank tape 18 and card 21 before the copying starts. Thus, when power failure occurs during the copying operation, the time of the actually performed copying operation is detected. From this time, the point number which has been copied is calculated. The point number, thus calculated, is subtracted from the number of points which must be recorded on IC card 21, thereby obtaining the remaining point number. The remaining point number, thus obtained, is recorded on card 21. As a result of this, IC card 21 remains valid, thus protecting the user right to record data. This can prevent card 21 remaining invalid and protect the user's right for the data recording.

Figure 18:
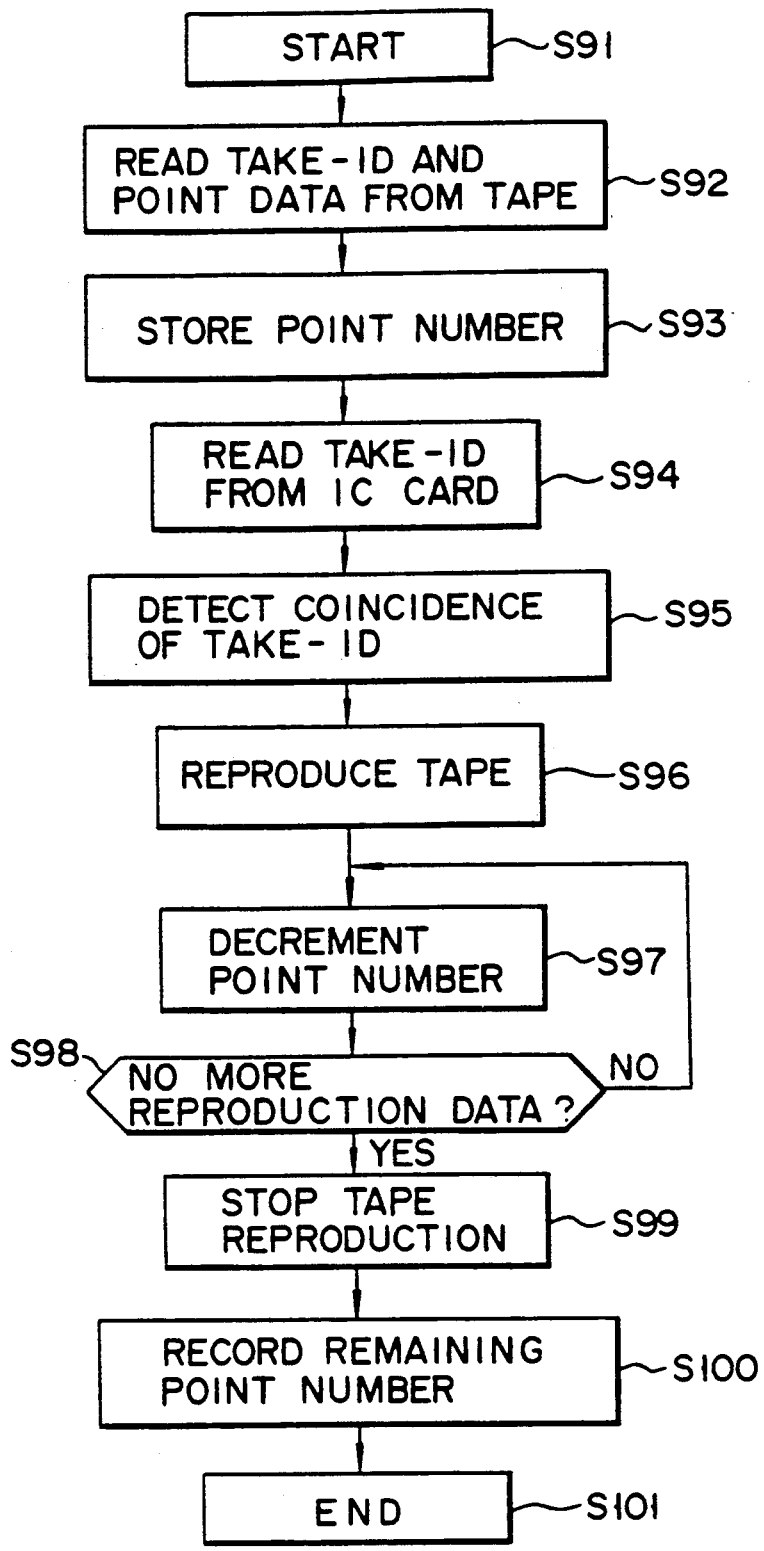

Although in the above explanation, the measure for possible power failure (see FIG. 18) is executed by digital audio tape recorder 11 under the control of microcomputer 15, it is not limited to such a type. For instance, blank taps 18 and IC card 21 may be removed from tape recorder 11 and mounted in another apparatus which is designed to cope with power failure and has a tape recording/reproducing function as well as a card recording/reproducing function, and then, the process as shown in FIG. 18 may be executed.

FIG. 19 illustrates another example of the power failure measure, with the same step numbers used to specify those corresponding or identical to the steps shown in FIG. 17 so that only different steps will be explained below. TAKE-ID generated in step S83 is stored in, for example, a register of microcomputer 15 in step S83a.

After the copying is stopped in step S88, TAKE-ID recorded on IC card 21 in step S85 is read out in step S88a. If this TAKE-ID coincides with TAKE-ID previously stored in the register, the remaining point number is recorded on card 21 in step S89.

According to this operation, the remaining point number is recorded only on the IC card 21 on which TAKE-ID has been recorded in step S85. This can prevent such an unauthorized use that the presently used IC card 21 is replaced with another IC card 21 during the copying operation to permit the recording of the remaining point number of this card 21.

Figure 20:
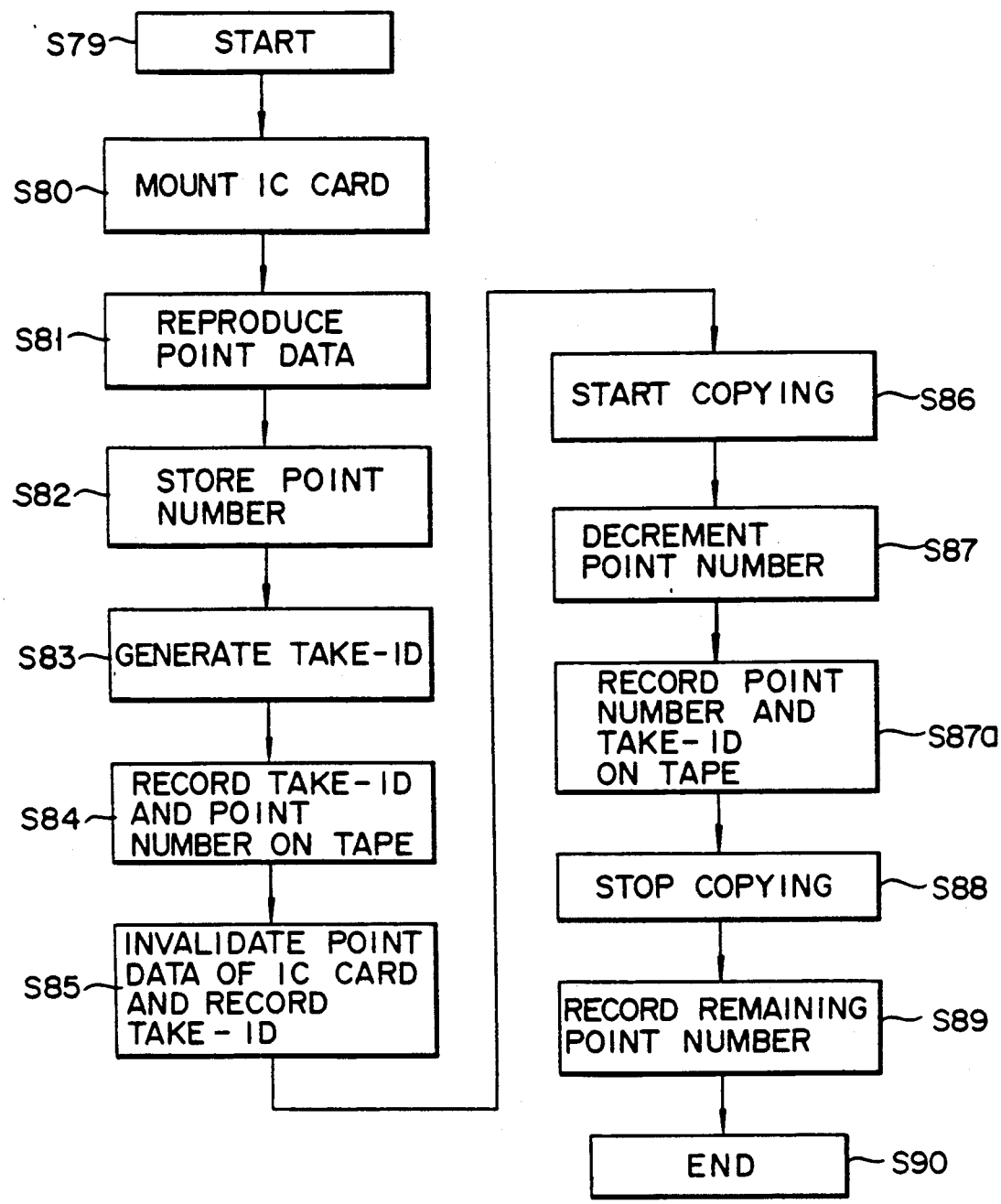

FIG. 20 illustrates a different example of the power failure measure; as the same step numbers are used in this diagram to specify those corresponding to the steps of FIG. 17, only the different steps will be explained below. Every time the point number is decremented in step S87, the decremented point number is recorded together with TAKE-ID on blank tape 18 in step S87a.

Figure 21:
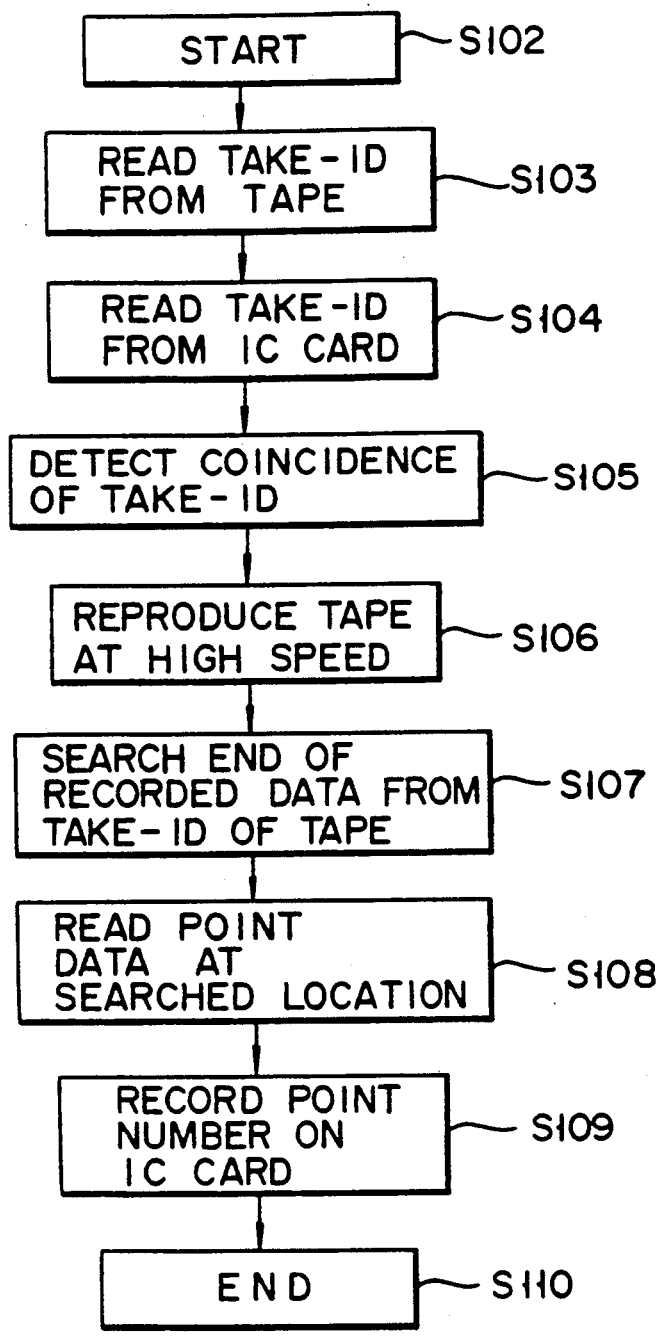

With this arrangement, as shown in FIG. 21, the measure taken for power failure during the copying operation can be made simpler than the one shown in FIG. 18. When the operation starts (step S102), microcomputer 15 controls recording/reproducing section 12 to read out TAKE-ID from blank tape 18 in step S103 and then controls card recording/reproducing section 20 to read TAKE-ID from IC card 21 in step S104. Microcomputer 15 detects coincidence of these two TAKE-IDs in step S105 and controls recording/reproducing section 12 to perform a high-speed reproduction of blank tape 10 in step S106.

In step S107, microcomputer 15 discriminates TAKE-ID included in the reproduced data and retrieves the end section of the data recorded on blank tape 18. After controlling recording/reproducing section 12 to read out the point number recorded at the retrieved end section of the data in step S108, microcomputer 15 controls card recording/reproducing section 20 to record the read point number on IC card 21 in step S109, which completes the operation (step S110).

With the above arrangement, every time the point number is decremented during the copying operation, this point number is recorded together with TAKE-ID on blank tape 18. Therefore, it is easy to find to which point on blank tape 18 data has been recorded at the time the power failure measure is taken, by discriminating TAKE-ID recorded on the tape 18. In addition, the point number recorded at the retrieved location needs to be simply recorded as it is on IC card 21, thus further simplifying the arrangement.

FIG. 22 illustrates a further example of the power failure measure; as the same step numbers are used in this diagram to specify those corresponding to the steps of FIG. 17, only the different steps will be explained below. Only TAKE-ID is recorded on blank tape 18 in step S84a, and the point data is invalidated in step S85a not by recording "0" on IC card 21, but leaving the point data intact on IC card 21 and setting an invalidation flag or discriminating the invalidation when TAKE-ID is not all "0."

With this arrangement, if power failure occurs during the copying operation and the remaining point number is not recorded on IC card 21, the point data on card 21 is forcibly read out disregarding the invalidation flag or the like when coincidence of TAKE-ID recorded on blank tape 18 with TAKE-ID recorded on card 21 is detected, and the point number is decreased in accordance with the time during which the copying has been performed and recorded on the card 21.

Figure 23:
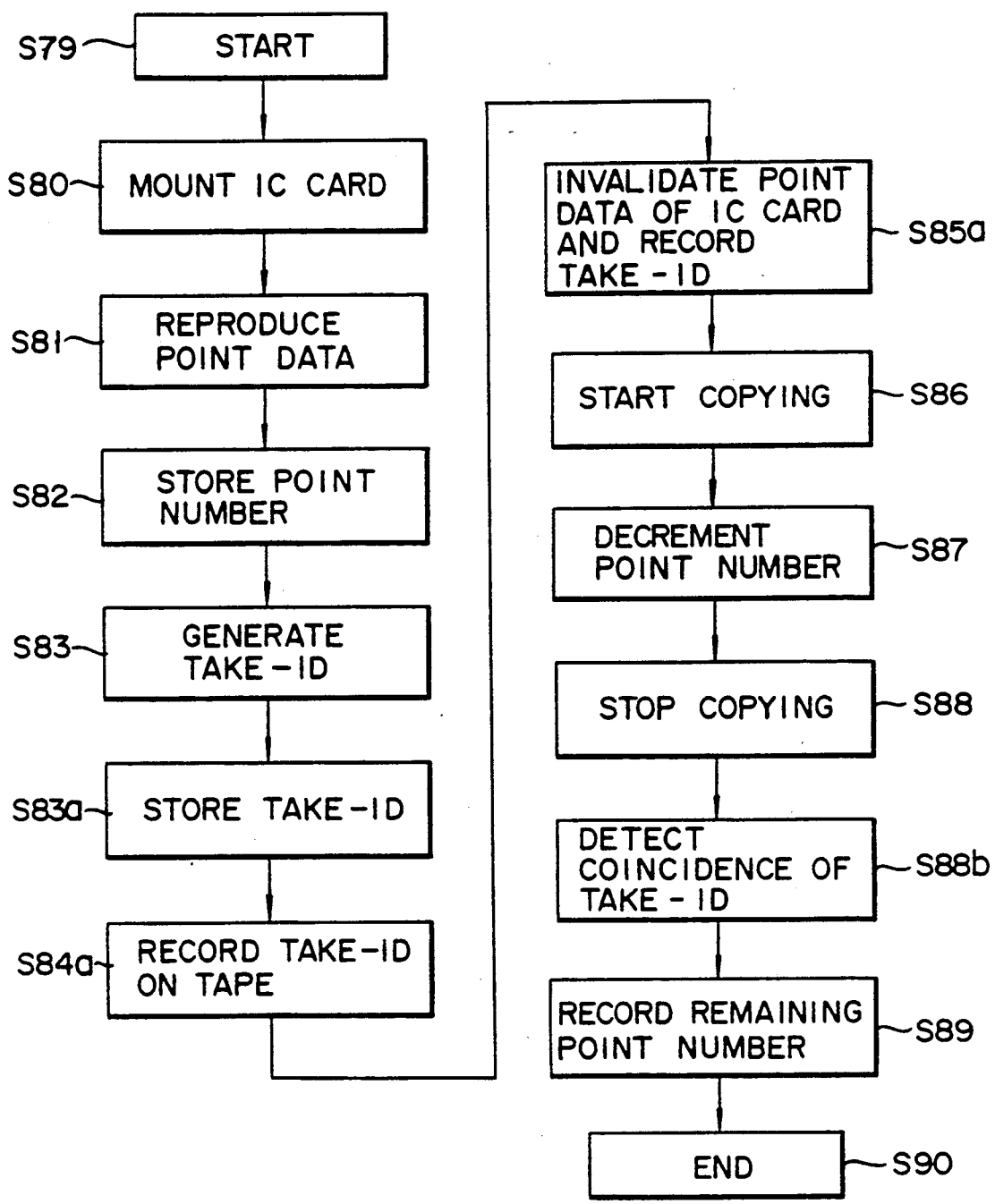

FIG. 23 illustrates a still further example of the power failure measure; as the same step numbers are used in this diagram to specify those corresponding to the steps of FIG. 22, only the different steps will be explained below. TAKE-ID generated in step S83 is stored in, for example, a register of microcomputer 15 in step S83a.

After the copying operation is stopped in step S88, TAKE-ID recorded on IC card 21 in step S85a is read out in step S88a and the remaining point number is recorded on IC card 21 in step S89 when this TAKE-ID coincides with the TAKE-ID previously stored in the register.

According to this operation, in step S89 the remaining point number is recorded only on IC card 21 that has TAKE-ID recorded thereon in step S85a. As explained above with reference to FIG. 19, therefore, it is possible to prevent such an unauthorized use that the presently used card 21 is replaced with another card 21 during the copying operation and the remaining point number is recorded on this card 21.

FIG. 24 illustrates a measure for performing the copying operation longer than the point number recorded on a single IC card 21. At the start of the operation (step S111), the user mounts card 21 in card recording/ reproducing section 20 in step S112 and the point data is reproduced from the card in step S113.

This point data is supplied to microcomputer 15 and is added to the previously-stored point number in step S114 and the resultant point number is stored in step S115. In the next step S116, microcomputer 15 generates TAKE-ID only when the first IC card 21 is mounted.

Then, microcomputer 15 controls recording/ reproducing section 12 to record TAKE-ID and the point number stored in step S114, on blank tape 18 in step S117. In the subsequent step S118, microcomputer 15 invalidates the point data on IC card 21 and records TAKE-ID thereon.

In step S119, the user discriminates whether or not a sufficient point number corresponding to the desired copying time is provided. If the point number is not sufficient (NO), the flow returns to step S112 where the user mounts a new IC card 21 and the above operation is repented. That is, the point number for the desired copying time can be secured before starting the copying operation by changing IC card 21 the necessary number of times.

When the user discriminates in step S119 that a sufficient point number is acquired (YES), the process ends (step S120) and the aforementioned copying operation will be executed thereafter.

With the above arrangement, a plurality of IC cards 21 are selectively reproduced and the point numbers read out from the cards are coupled to determine the time for data copying on blank tape 13. If the user desires longer copying than the time determined by the point number recorded on card 21, it is unnecessary to change card 21 during the copying operation so that continuous copying can be done, thus making the operation convenient for the user.

In this case, as shown in FIG. 25, a plurality of card recording/reproducing sections 201, 202, . . . may be provided in digital audio tape recorder 11 to read the point data from the respective IC cards 211, 212, . . . , and the point data are sequentially supplied to microcomputer 15 so that the point numbers are added together.

Although the above explanation has been given with reference to the case where the point number recorded on a tape or a card is time data in the units of one minute, it is not limited to the time but may be set to correspond to the number of pieces of music.

What is claimed is:

1. A recording control apparatus comprising:
   a recording medium capable of having an information signal recorded thereon;
   a recording device for recording said information signal on said recording medium;
   restriction means for restricting said recording device from recording said information signal on said recording medium in the presence of a restriction signal;
   a release-signal-holding medium having a release signal for releasing the recording restriction of said restriction means said release-signal-holding medium not including said information signal to be recorded on said recording medium, said release-signal-recording medium being physically separable from the recording device so as to permit selective distribution of said release-signal-recording medium separately from distribution of said recording device; and
   releasing means responsive to said release signal for enabling the recording device to record said information signal in the presence of said restriction signal.

2. A recording control apparatus comprising:
   a recording medium capable of having an information signal recorded thereon;
   a recording device for recording said information signal on said recording medium;
   restriction means for restricting said recording device from recording said information signal on said recording medium in the presence of a restriction signal;
   an override-signal-recording medium having an override signal for overriding said restriction signal; and
   releasing means responsive to said override signal for enabling the recording device to record said information signal in the presence of said restriction signal.

* * * * *